(12) United States Patent
Nishibayashi et al.

(10) Patent No.: US 9,209,629 B2
(45) Date of Patent: Dec. 8, 2015

(54) CHARGE-DISCHARGE CONTROL DEVICE, CHARGE-DISCHARGE CONTROL SYSTEM, AND COMPUTER PROGRAM PRODUCT

(71) Applicant: KABUSHIKI KAISHA TOSHIBA, Minato-ku, Tokyo (JP)

(72) Inventors: Yasuyuki Nishibayashi, Kanagawa (JP); Keiichi Teramoto, Tokyo (JP); Kotaro Ise, Kanagawa (JP); Yasuyuki Tanaka, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 231 days.

(21) Appl. No.: 13/727,842

(22) Filed: Dec. 27, 2012

(65) Prior Publication Data

US 2013/0257384 A1    Oct. 3, 2013

(30) Foreign Application Priority Data

Mar. 29, 2012  (JP) ................. 2012-076624

(51) Int. Cl.
*H02J 7/00*      (2006.01)

(52) U.S. Cl.
CPC ............ *H02J 7/0013* (2013.01); *H02J 7/0022* (2013.01); *H02J 7/0027* (2013.01); *H02J 7/0073* (2013.01)

(58) Field of Classification Search
CPC ..... H02J 7/0013; H02J 7/0022; H02J 7/0027; H02J 7/0073
See application file for complete search history.

(56) References Cited

U.S. PATENT DOCUMENTS

| 6,639,383 | B2 | 10/2003 | Nelson | |
|---|---|---|---|---|
| 2005/0200332 | A1* | 9/2005 | Kangas et al. | 320/128 |
| 2011/0025258 | A1* | 2/2011 | Kim et al. | 320/106 |

FOREIGN PATENT DOCUMENTS

| JP | 2010-268602 | 11/2010 |
|---|---|---|
| JP | 2012-060835 | 3/2012 |

OTHER PUBLICATIONS

Office Action of Notice of Rejection for Japanese Patent Application No. 2012-076624 Dated Apr. 30, 2014, 5 pgs.

* cited by examiner

*Primary Examiner* — Nha Nguyen
(74) *Attorney, Agent, or Firm* — Amin, Turocy & Watson, LLP

(57) ABSTRACT

According to an embodiment, a charge-discharge control device includes a receiving unit and a group controller. The receiving unit is configured to receive schedule information that indicates a schedule time at which a plurality of electric power devices, each having at least either a charging function or a discharging function, performs at least either charging or discharging. The group controller is configured to, according to the schedule information, perform grouping in such a way that each of the electric power devices belongs to either one of a charging group for performing charging and a discharging group for performing discharging, and control, on a group-by-group basis, each of the electric power devices put in the charging group and each of the electric power devices put in the discharging group.

16 Claims, 18 Drawing Sheets

FIG.7A

| CONFIGURATION EXAMPLE OF CHARACTERISTICS INFORMATION ||
|---|---|
| RATED CHARGE-DISCHARGE ELECTRIC POWER | P (W) |
| RATED CAPACITY | Q (Wh) |
| CHARGING RATE (SOC) | X (%) |
| DISCHARGEABLE TIME | α (h) |
| CHARGEABLE TIME | β (h) |
| TYPE | BATTERY UNIT |

FIG.7B

| CONFIGURATION EXAMPLE OF CHARGE-DISCHARGE CONTROL INFORMATION ||
|---|---|
| TARGET BATTERY UNIT | ENERGY STORAGE SYSTEM A |
| CHARGE-DISCHARGE INFORMATION | ALREADY SET/NOT SET |
| CHARGE-DISCHARGE DETAILS | CHARGE/DISCHARGE |

FIG.7C

| CONFIGURATION EXAMPLE OF FEASIBILITY INFORMATION ||
|---|---|
| BATTERY UNIT ALLOWED TO PERFORM SHARING | ENERGY STORAGE SYSTEM A |

FIG.7D

| CONFIGURATION EXAMPLE OF DEDICATED DEVICE INFORMATION ||
|---|---|
| CHARGING-ONLY DEVICE | HEAT ACCUMULATOR DEVICE A |
| DISCHARGING-ONLY DEVICE | PHOTOVOLTAIC POWER GENERATING DEVICE A, WIND POWER GENERATING DEVICE A |

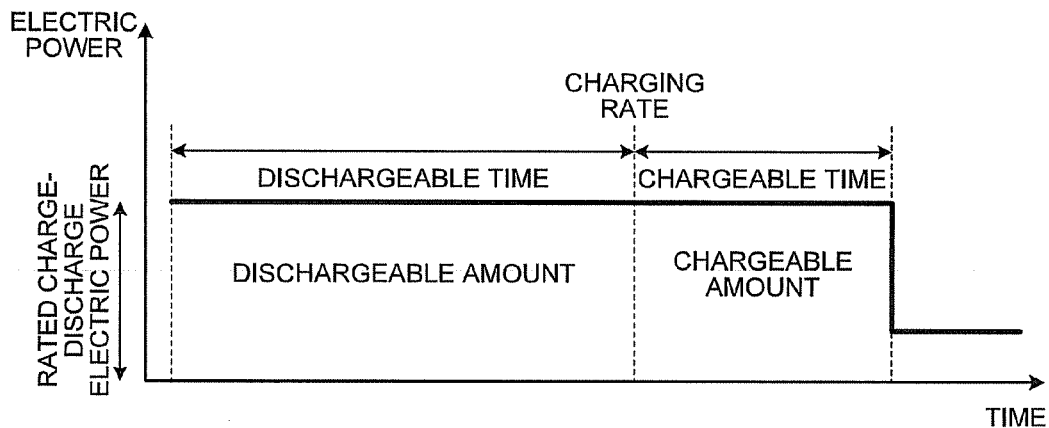

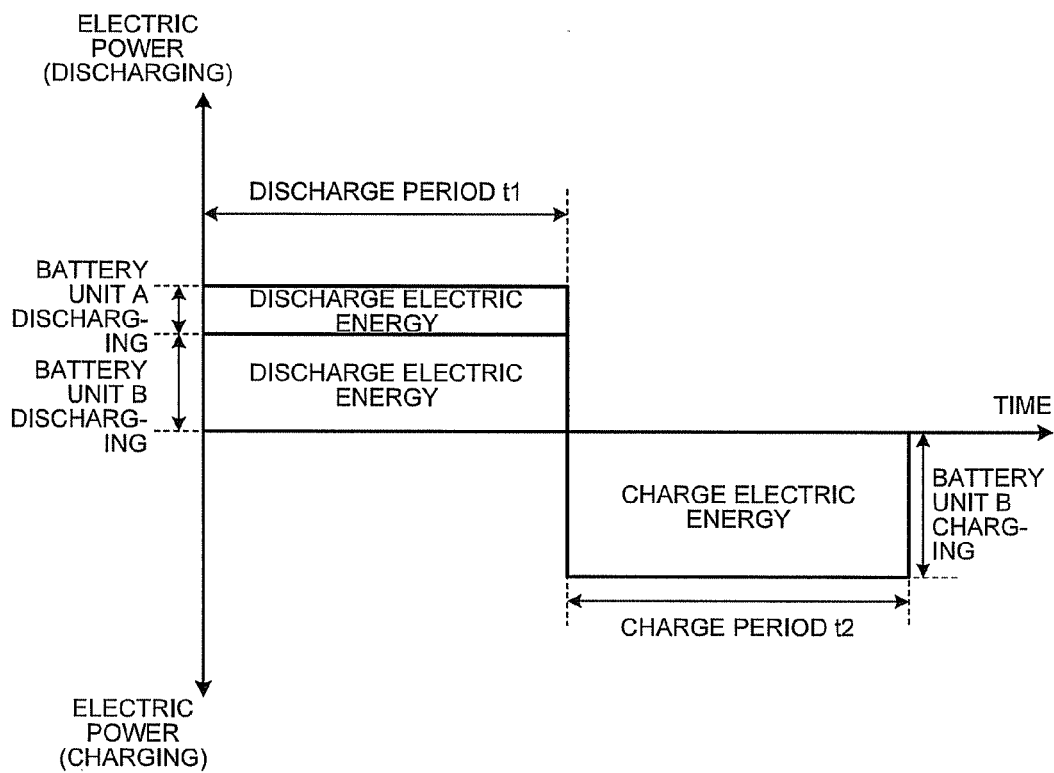

FIG.12A

| CONFIGURATION EXAMPLE OF ACCESS CONTROL INFORMATION ||
|---|---|
| CONTROL AUTHORIZATION RESIDUAL QUANTITY | RESIDUAL QUANTITY 0 |
| DEVICES HAVING CONTROL AUTHORIZATION | EMSa, EMSb |

FIG.12B

| CONFIGURATION EXAMPLE OF CHARACTERISTICS INFORMATION ||
|---|---|
| RATED CHARGE-DISCHARGE ELECTRIC POWER | P (W) |
| RATED CAPACITY | Q (Wh) |
| CHARGING RATE (SOC) | X (%) |
| DISCHARGEABLE TIME | $\alpha$ (h) |
| CHARGEABLE TIME | $\beta$ (h) |
| TYPE | BATTERY UNIT |

FIG.12C

| CONFIGURATION EXAMPLE OF OPERATION CONTROL INFORMATION ||
|---|---|
| ON-DEMAND OPERATION | DISABLED |
| SCHEDULED OPERATION | ENABLED |

FIG.13A

| CONFIGURATION EXAMPLE OF CHARGE-DISCHARGE DETERMINATION INFORMATION | |
|---|---|
| CHARGE REQUEST AT TIME OF CHARGING | ALLOWED |
| DISCHARGE REQUEST AT TIME OF CHARGING | NOT ALLOWED |
| CHARGE REQUEST AT TIME OF DISCHARGING | NOT ALLOWED |
| DISCHARGE REQUEST AT TIME OF DISCHARGING | ALLOWED |

FIG.13B

| CONFIGURATION EXAMPLE OF CHARGE-DISCHARGE ELECTRIC POWER INFORMATION | |
|---|---|
| RATED DISCHARGE ELECTRIC POWER | P (W) |
| RATED CHARGE ELECTRIC POWER | P (W) |
| DISCHARGEABLE TIME | $\alpha$ (h)*CONTINUALLY UPDATED WHILE PERFORMING CHARGING AND DISCHARGING |
| CHARGEABLE TIME | B (h)*CONTINUALLY UPDATED WHILE PERFORMING CHARGING AND DISCHARGING |
| ALLOWED ELECTRIC ENERGY | EMSa: DISCHARGE PERIOD toA, DISCHARGE ELECTRIC POWER poA  EMSb: DISCHARGE PERIOD toA, DISCHARGE ELECTRIC POWER poB  EMSa: CHARGE PERIOD tiA, CHARGE ELECTRIC POWER piA |

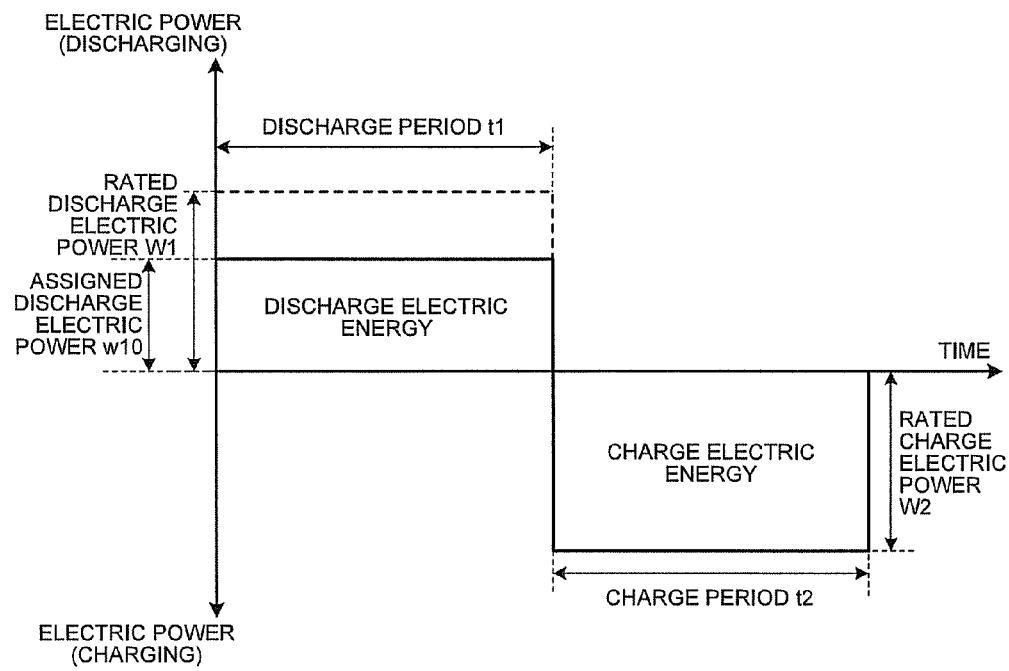

CHARGE-DISCHARGE CONTROL DEVICE, CHARGE-DISCHARGE CONTROL SYSTEM, AND COMPUTER PROGRAM PRODUCT

CROSS-REFERENCE TO RELATED APPLICATIONS

This application is based upon and claims the benefit of priority from Japanese Patent Application No. 2012-076624, filed on Mar. 29, 2012; the entire contents of which are incorporated herein by reference.

FIELD

Embodiments described herein relate generally to a charge-discharge control device, a charge-discharge control system, and a computer program product.

BACKGROUND

It is known that the result of measuring electricity consumption of electricity users or the result of measuring the electricity generated by photovoltaic power generation is sent to a server for the purpose of electric energy management. Moreover, it is a known fact that large-scale energy management, on a larger scale than households or buildings, is performed via a network.

However, if there is an increase in the number of electric power devices that perform discharging or charging and that are connected to a network, it leads to an overload in the amount of information that is communicated via the network. As a result, it becomes difficult to perform communication in an efficient manner.

BRIEF DESCRIPTION OF THE DRAWINGS

FIGS. 7A to 7D are diagrams illustrating a configuration of characteristics information, a configuration of charge-discharge control information, a configuration of feasibility information, and a configuration of dedicated device information, respectively;

FIG. 8 is a graph illustrating a relationship between the charging rate, the chargeable time, and the dischargeable time;

FIG. 9 is a diagram for explaining the state of management performed by an electric power control unit with respect to the total amount of charging and discharging;

FIG. 10 is a graph illustrating the state of management performed by the electric power control unit with respect to the total amount of charging and discharging;

FIGS. 12A to 12C are diagrams illustrating a configuration of access control information, a configuration of characteristics information, and a configuration of operation control information;

FIGS. 13A and 13B are diagrams illustrating a configuration of charge-discharge determination information and a configuration of charge-discharge electric power information;

FIGS. 17A to 17C are configuration diagrams illustrating configuration examples of communication messages;

FIG. 18 is a graph illustrating an assigned discharge electric power with respect to the charge-discharge control device;

DETAILED DESCRIPTION

According to an embodiment, a charge-discharge control device includes a receiving unit and a group controller. The receiving unit is configured to receive schedule information that indicates a schedule time at which a plurality of electric power devices, each having at least either a charging function or a discharging function, performs at least either charging or discharging. The group controller is configured to, according to the schedule information, perform grouping in such a way that each of the electric power devices belongs to either one of a charging group for performing charging and a discharging group for performing discharging, and control, on a group-by-group basis, each of the electric power devices put in the charging group and each of the electric power devices put in the discharging group.

Figure 1:
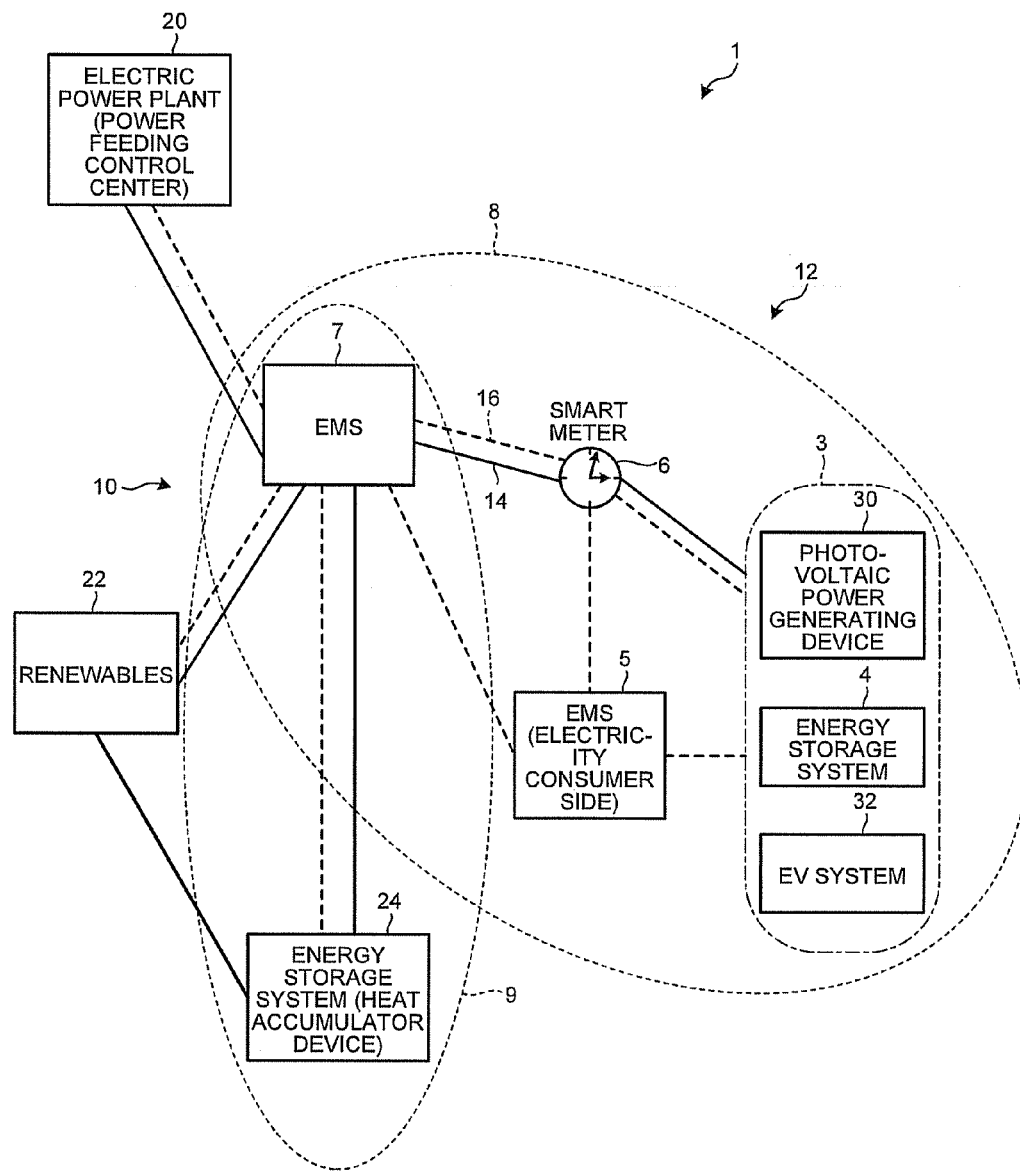
FIG. 1 is a system configuration diagram illustrating an exemplary configuration of a charge-discharge control system according to an embodiment.

An exemplary embodiment of a charge-discharge control system is described below in detail with reference to the accompanying drawings. FIG. 1 is a system configuration diagram illustrating an exemplary configuration of a charge-discharge control system 1 according to the embodiment. As illustrated in FIG. 1, the charge-discharge control system 1 is, for example, a system for controlling the energy over a wide area. The charge-discharge control system 1 includes an electric power system side 10 and includes an CONSUMER SIDE 12 such as a household, a building, or a factory.

The electric power system side 10 includes, for example, an electric power plant (a power feeding control center) 20, a RENEWABLES 22, and a ENERGY STORAGE SYSTEM 24. The CONSUMER SIDE 12 includes, for example, a consumer-side electric power system 3, a charge-discharge control device (a consumer-side energy management system (EMS)) 5, and a smart meter 6. Moreover, for example, a charge-discharge control device 7 is installed as an energy management system (EMS) between the electric power system side 10 and the CONSUMER SIDE 12. The charge-discharge control device 7 controls, for example, the charging and the discharging of the entire charge-discharge control system 1. The charge-discharge control device 5 controls, for example, the charging and the discharging on the CONSUMER SIDE 12. Meanwhile, practically, the charge-discharge control device 5 and the charge-discharge control device 7 may have the same functions and the same configuration.

The electric power plant 20 generates a large amount of electric power by making use of the hydraulic power, the thermal power, or the nuclear power. The electric power plant 20 is connected to the charge-discharge control device 7 via an electric power grid 14 and via a communication network (network) 16, and supplies (discharges) the electric power to the electric power grid 14. The RENEWABLES 22 is, for example, a photovoltaic power plant or a wind power plant, and generates electric power by making use of the energy available in the natural world. The RENEWABLES 22 is connected to the charge-discharge control device 7 via the electric power grid 14 and via the communication network 16, and supplies (discharges) the electric power to the electric power grid 14.

The ENERGY STORAGE SYSTEM 24 includes storage batteries (not illustrated) for performing charging and discharging, and is connected to the charge-discharge control device 7 via the electric power grid 14 and via the communication network 16. Moreover, the ENERGY STORAGE SYSTEM 24 is connected to the RENEWABLES 22 via the electric power grid 14, and is used to store the surplus electric power generated by the RENEWABLES 22. In addition, with the aim of maintaining the electric quality such as the frequency or the voltage of the electric power system side 10, the ENERGY STORAGE SYSTEM 24 is also used to implement a function called ancillary service (short-period control) in which power conditioning is done on the second time scale in response to momentary load changes so as to stabilize the electric power system side 10. Meanwhile, the ENERGY STORAGE SYSTEM 24 can be replaced with, for example, a heat accumulator device that discharges heat. In the embodiment, the entire transmission and distribution network that is used in supplying the electric power from the electric power system side 10 to the CONSUMER SIDE 12 is referred to as the electric power grid 14.

The consumer-side electric power system 3 includes, for example, a photovoltaic power generating device 30, an electric vehicle (EV) system 32, and a ENERGY STORAGE SYSTEM 4. The consumer-side electric power system 3 is connected to the charge-discharge control device 7 via the electric power grid 14 and via the communication network 16; and the smart meter 6 is installed between the consumer-side electric power system 3 and the charge-discharge control device 7. The charge-discharge control device 5 is connected to the charge-discharge control device 7, the consumer-side electric power system 3, and the smart meter 6 via the network 16; and functions as a charge-discharge control device that controls the consumer-side electric power system 3 and the smart meter 6. Herein, for example, the smart meter 6 has the function of a measurement apparatus for measuring the electric energy that has been consumed by the consumer-side electric power system 3 and sending the measurement result to an administration server (not illustrated) and to the charge-discharge control device 7.

The photovoltaic power generating device 30 generates electricity by making use of the sunlight and stores the generated electricity in, for example, the ENERGY STORAGE SYSTEM 4. The EV system 32 is connected to the electric power grid 14 and the network 16 via a charging device (not illustrated). The ENERGY STORAGE SYSTEM 4 includes storage batteries (not illustrated) for performing charging and discharging, and is used to implement a function called peak shift (day-long operation) in which the electricity is stored during the nighttime and used during the daytime.

The charge-discharge control device 7 considers the CONSUMER SIDE 12, which includes the ENERGY STORAGE SYSTEM 4 and the EV system 32, as a single logical CONSUMER SIDE BATTERY UNIT 8; and considers the electric power system side 10, which includes the ENERGY STORAGE SYSTEM 24, as a single logical system-side BATTERY UNIT 9. Alternatively, the charge-discharge control device 7 may consider the charge-discharge control device 5, the smart meter 6, and the photovoltaic power generating device 30 as the CONSUMER SIDE BATTERY UNIT 8; and can consider the electric power plant 20 and the RENEWABLES 22 as the system-side BATTERY UNIT 9. Still alternatively, the charge-discharge control device 7 either may consider all storage batteries included in the charge-discharge control system 1 or can consider an arbitrary number of storage batteries as a single logical BATTERY UNIT. For example, the charge-discharge control device 7 can consider all of a plurality of CONSUMER SIDE storage batteries 8 and all of a plurality of system-side storage batteries 9 as a logical BATTERY UNIT.

Figure 2A:
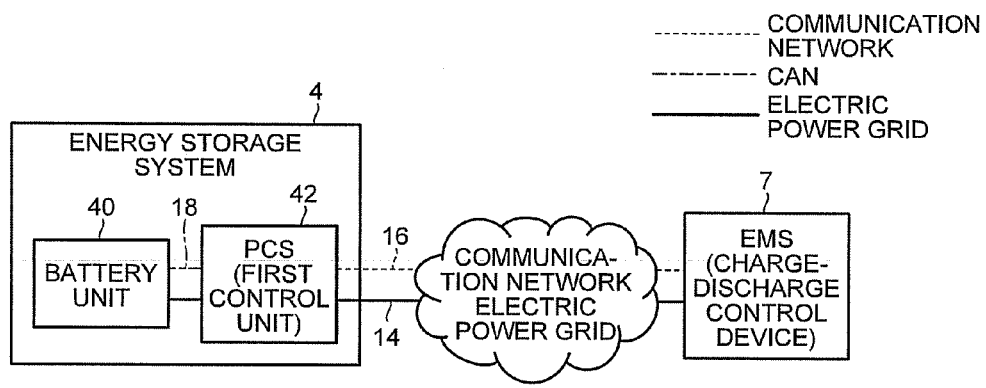
FIGS. 2A and 2B are configuration diagrams each illustrating a configuration of a ENERGY STORAGE SYSTEM connected to a charge-discharge control device.
Figure 2B:
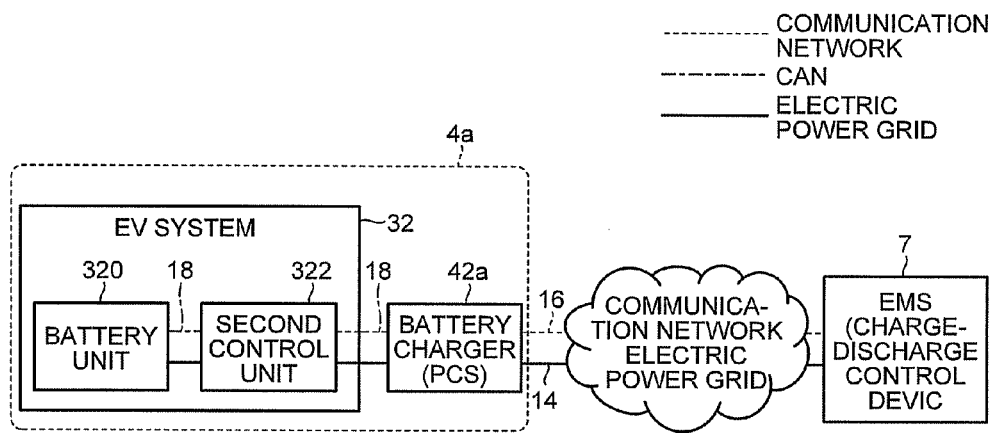

FIG. 2A is a configuration diagram of the ENERGY STORAGE SYSTEM 4 connected to the charge-discharge control device 7, and FIG. 2B is a configuration diagram of a ENERGY STORAGE SYSTEM 4a connected to the charge-discharge control device 7. As illustrated in FIG. 2A, the ENERGY STORAGE SYSTEM 4 is an electric power device including a BATTERY UNIT 40 and a PCS (FIRST CONTROL UNIT) 42. The BATTERY UNIT 40 is, for example, a battery management unit (BMU) that includes a plurality of battery cells (not illustrated) and an internal processor (not illustrated), and that performs charging and discharging of electric power under the control of the PCS (FIRST CONTROL UNIT) 42. Herein, the PCS (FIRST CONTROL UNIT) 42 functions as, for example, a power conditioning system (PCS). The PCS (FIRST CONTROL UNIT) 42 is connected to the charge-discharge control device 7 via the electric power grid 14 and via the network 16, and is connected to the BATTERY UNIT 40 via the electric power grid 14 and via a controller area network (CAN) 18.

More particularly, the BATTERY UNIT 40 notifies the PCS (FIRST CONTROL UNIT) 42 of the battery rated voltage, the maximum current value during charging, the charging rate SOC (State Of Charge), and the life rate SOH (State Of Health). Then, the PCS (FIRST CONTROL UNIT) 42 performs, for example, direct current-alternating current conversion and voltage fluctuation control.

As illustrated in FIG. 2B, the EV system 32 includes a BATTERY UNIT 320 and a second control unit 322. The EV system 32 is connected to a battery charger 42a, and in turn gets connected to the electric power grid 14 and the network 16 via the battery charger 42a.

The BATTERY UNIT 320 is, for example, a battery management unit (BMU) that includes a plurality of battery cells (not illustrated) and an internal processor (not illustrated), and that performs charging and discharging of the electric power. The second control unit 322 is connected to the BATTERY UNIT 320 via the electric power grid 14 and the CAN 18, and is connected to the battery charger 42a via the electric power grid 14 and the CAN 18. Then, the second control unit 322 relays the communication between the battery charger 42a and the BATTERY UNIT 320.

The battery charger 42a functions as a power conditioning system (PCS) mentioned above. Thus, by getting connected to the battery charger 42a, the EV system 32 constitutes the ENERGY STORAGE SYSTEM 4a that is equivalent to the ENERGY STORAGE SYSTEM 4.

Figure 3:
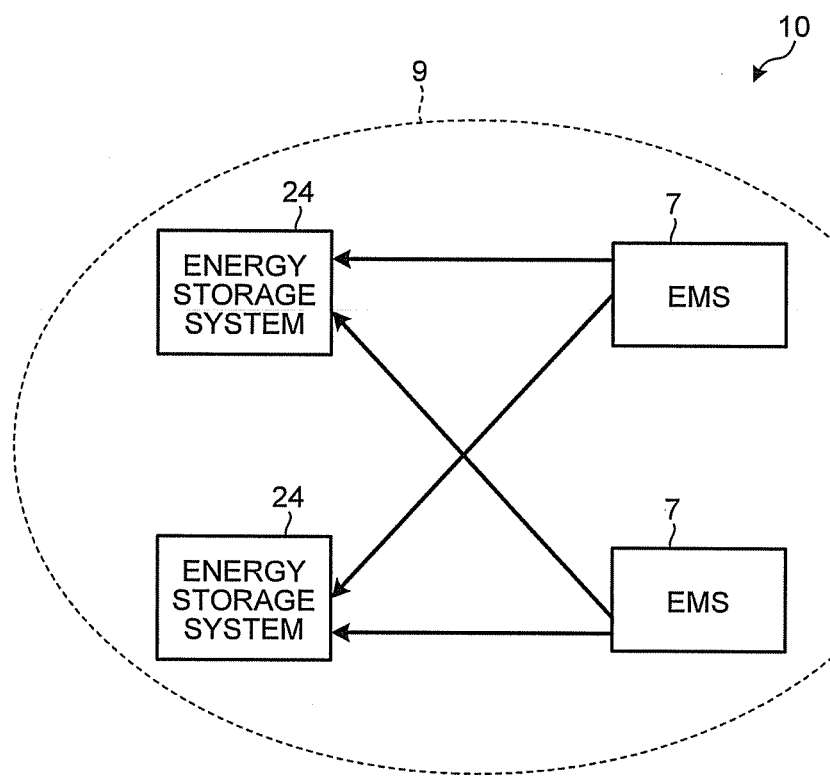
FIG. 3 is a configuration diagram illustrating a connection between the charge-discharge control device and a ENERGY STORAGE SYSTEM.

FIG. 3 is a configuration diagram illustrating a connection example between the charge-discharge control device 7 and the ENERGY STORAGE SYSTEM 24 on the electric power system side 10. As illustrated in FIG. 3, on the electric power system side 10, the charge-discharge control system 1 includes two ENERGY STORAGE SYSTEMs 24 that are connected to two charge-discharge control devices 7. The configuration can be such that each ENERGY STORAGE SYSTEM 24 is controlled by each charge-discharge control device 7. In this way, in the charge-discharge control system 1, a plurality of ENERGY STORAGE SYSTEMs 24 can be connected to each other so that a large storage capacity is secured that matches the large storage capacity of an electric power plant. Then, the function called ancillary service can be implemented to deal with momentary load changes. Meanwhile, in the case when the electric power stored across a plurality of areas is interchanged, it is desirable that a plurality of charge-discharge control devices 7 are installed in the charge-discharge control system 1. In the embodiment, the charge-discharge control device 7 performs grouping to divide the system-side BATTERY UNIT 9 into a plurality of groups.

Figure 4:
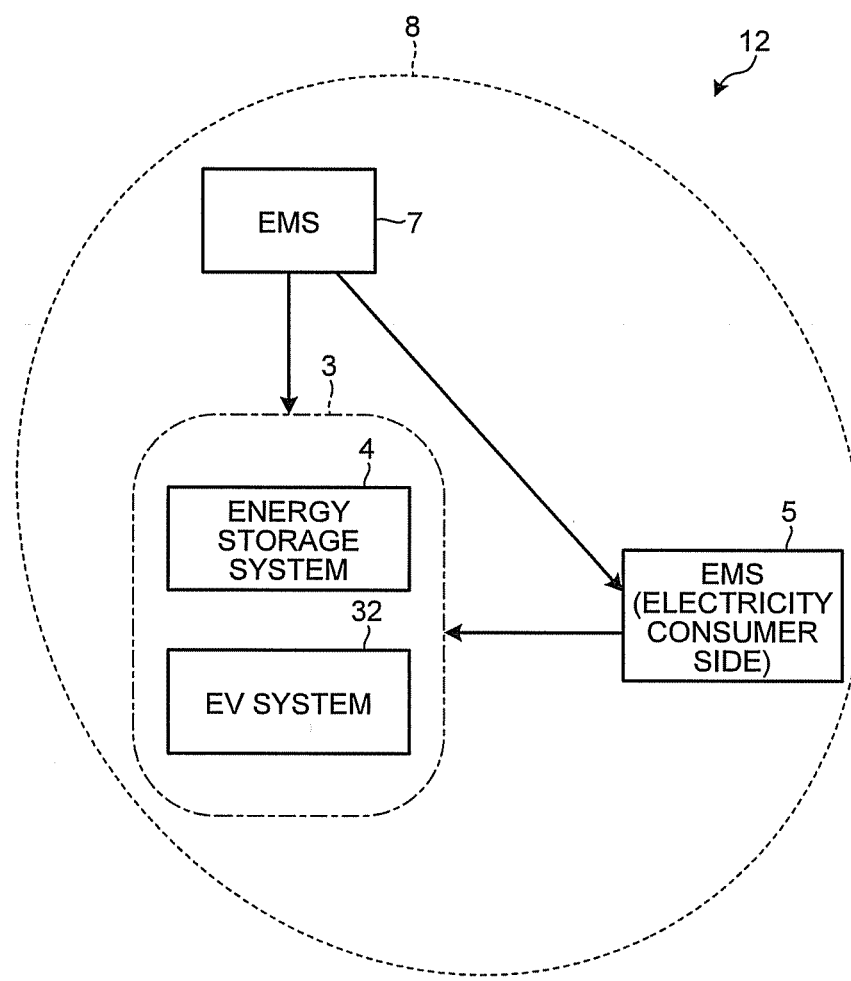
FIG. 4 is a configuration diagram illustrating a connection between two charge-discharge control devices and a consumer-side electric power system.

FIG. 4 is a configuration diagram illustrating a connection example between the charge-discharge control device 7, the charge-discharge control device 5, and the consumer-side electric power system 3 on the CONSUMER SIDE 12. As illustrated in FIG. 4, when the charge-discharge control device 7 and the charge-discharge control device 5 control the consumer-side electric power system 3, the charge-discharge control device 7 or the charge-discharge control device 5 performs grouping to divide the CONSUMER SIDE BATTERY UNIT 8 into a plurality of groups. For example, the charge-discharge control device 7 performs grouping to divide the CONSUMER SIDE BATTERY UNIT 8 as well as the system-side BATTERY UNIT 9 into a charging group for performing charging and into a discharging group for performing discharging.

Figure 5:
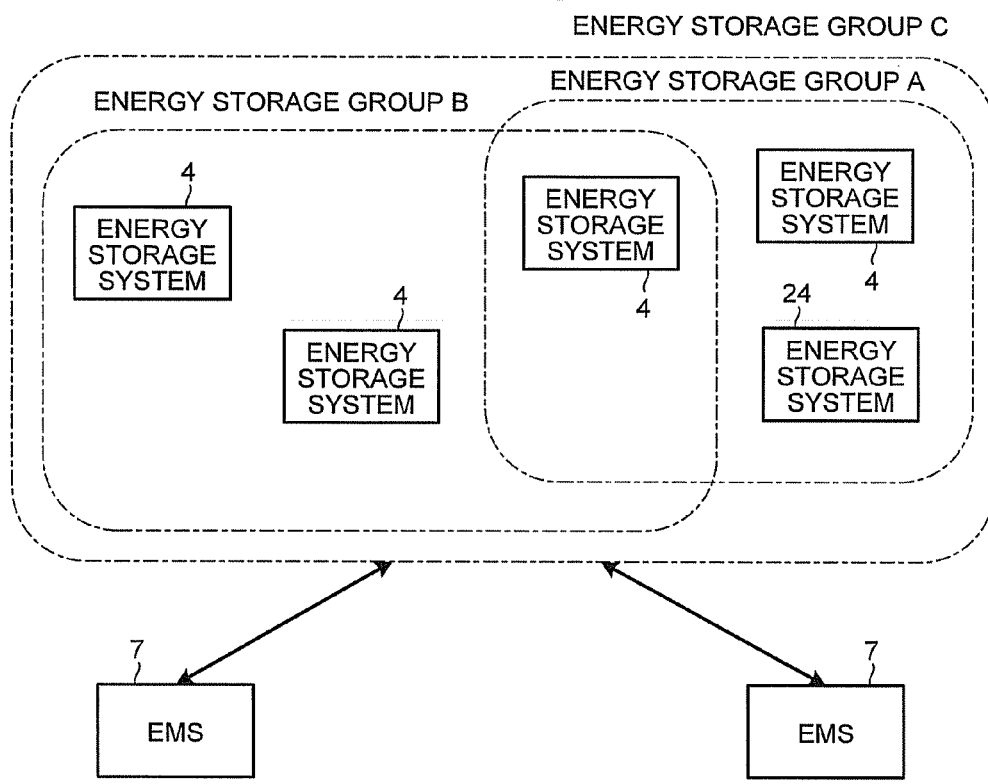
FIG. 5 is a conceptual diagram illustrating a condition in which a collection of a plurality of ENERGY STORAGE SYSTEMs is controlled as a single logical BATTERY UNIT.

FIG. 5 is a conceptual diagram illustrating a condition in which the charge-discharge control device 7 controls a collection of a plurality of ENERGY STORAGE SYSTEMs 4 as a single logical BATTERY UNIT. As illustrated in FIG. 5, the charge-discharge control device 7 groups the collection of the plurality of ENERGY STORAGE SYSTEMs 4 into, for example, a ENERGY STORAGE GROUP A, a ENERGY STORAGE GROUP B, and a ENERGY STORAGE GROUP C; performs control on a group-by-group basis; and, for example, assigns shared use rights to a plurality of users. Thus, the charge-discharge control device 7 may group a plurality of ENERGY STORAGE SYSTEMs 4 performing charging into a plurality of different charging groups. Similarly, the charge-discharge control device 7 may group a plurality of ENERGY STORAGE SYSTEMs 4 performing discharging into a plurality of different discharging groups.

Figure 6:
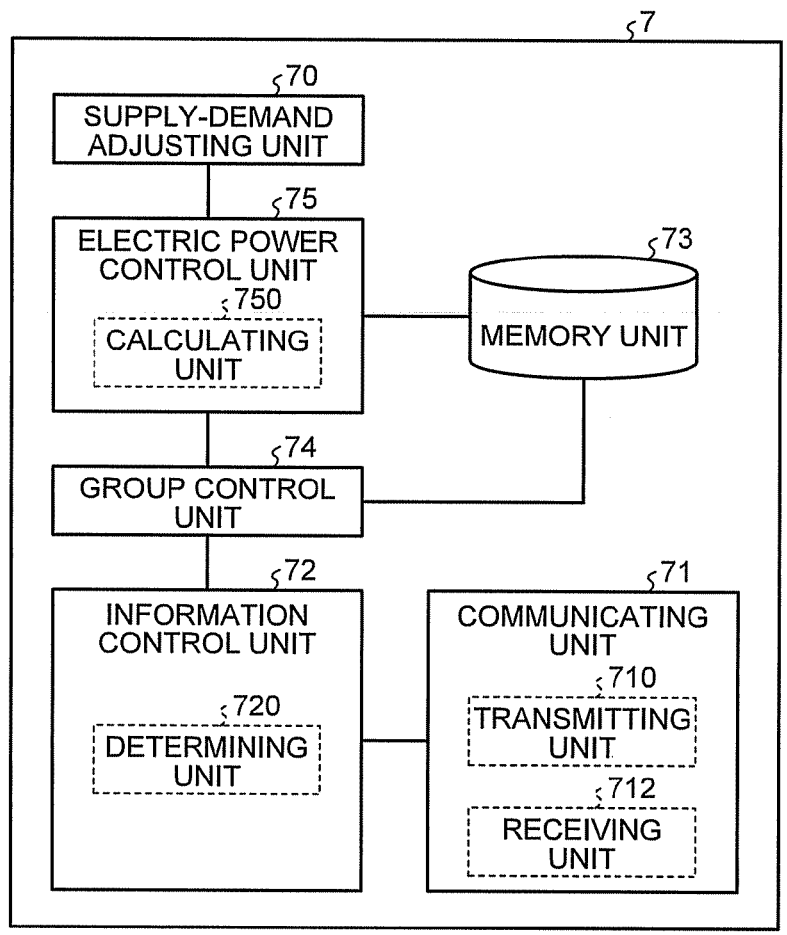
FIG. 6 is a functional block diagram illustrating the functions of the charge-discharge control device.

Explained below in detail are the functions of the charge-discharge control device 7. FIG. 6 is a functional block diagram illustrating the functions of the charge-discharge control device 7. The charge-discharge control device 7 functions as a computer and includes a supply-demand adjusting unit 70, a communicating unit 71, an information control unit 72, a memory unit 73, a group control unit 74, and an electric power control unit 75.

The supply-demand adjusting unit 70 monitors the electricity and the frequency condition on the electric power system side 10 of an electric power provider and on the CONSUMER SIDE 12. Moreover, in order to prevent electricity failure due to electric power shortage, the supply-demand adjusting unit 70 performs discharging control and charging control with respect to the ENERGY STORAGE SYSTEM 24 and the ENERGY STORAGE SYSTEM 4.

The communicating unit 71 includes a transmitting unit 710 and a receiving unit 712, and performs communication via the network 16.

The information control unit 72 includes a determining unit 720, and processes and controls the information that is obtained via the communicating unit 71. For example, the information control unit 72 obtains a communication message, which is related to electric energy information or access control of the BATTERY UNIT 40 that is required for performing charging and discharging control, from the ENERGY STORAGE SYSTEM 4 via the communicating unit 71; and accordingly performs processing and control.

The determining unit 720 determines, according to feasibility information (described later), whether or not it is allowed to simultaneously put an electric power device such as the ENERGY STORAGE SYSTEM 4 in a plurality of different charging groups. Similarly, the determining unit 720 also determines, according to the feasibility information (described later), whether or not it is allowed to simultaneously put an electric power device such as the ENERGY STORAGE SYSTEM 4 in a plurality of different discharging groups.

The memory unit 73 is used to store characteristics information, charge-discharge control information, the feasibility information, and dedicated device information. FIGS. 7A to 7D are diagrams illustrating configuration examples of the characteristics information, the charge-discharge control information, the feasibility information, and the dedicated device information.

The characteristics information points to the information that is peculiar to the BATTERY UNIT 40 and that is required for performing charging and discharging control. As illustrated in FIG. 7A, the characteristics information contains rated charge-discharge electric power indicated in unit watt (W: watt) with respect to the BATTERY UNIT; rated capacity indicated in unit watt hour (Wh: watt hour); charging rate (SOC: State Of Charge) indicted in unit percentage; dischargeable time corresponding to SOC; chargeable time corresponding to SOC; and type corresponding to SOC.

In the constant current charging method that is the commonly-used charging method for charging a BATTERY UNIT, the electric energy (amount of current) that is input-output by the battery cells in the BATTERY UNIT 40 remains constant until the SOC indicated in percentage reaches a predetermined threshold value. For example, as illustrated in FIG. 8, with respect to the ENERGY STORAGE SYSTEM 4, the value of SOC is obtained from the BATTERY UNIT 40 so that it becomes possible to calculate the dischargeable time and the chargeable time (horizontal axis of graph), the rated charge-discharge electric power (vertical axis of graph), and the electric energy (product of chargeable-dischargeable time and electric power) that is required for charging and discharging. Thus, the characteristics information may contain condition calculating information that enables derivation of the chargeable time and the rated value.

In constant current charging, the BATTERY UNIT 40 has the characteristics that, when the SOC exceeds the predetermined threshold value, the amount of current required for charging is minimized. Meanwhile, the electric energy at the time of controlling charging or discharging can be indicated not only as the electric energy in unit watt time (Wh: watt hour) but also as the amount of current in unit ampere time (Ah: ampere hour) or as the voltage (Vh: volt hour) in unit volt time.

The charge-discharge control information is used in identifying the charge-discharge operation condition of the ENERGY STORAGE SYSTEM 4. As illustrated in FIG. 7B, the charge-discharge control information contains a target BATTERY UNIT, charge-discharge information, and charge-discharge details. The target BATTERY UNIT indicates the BATTERY UNIT 40 that is to be controlled for charge-discharge. The charge-discharge information contains an "already set" status or a "not set" status that are used in identifying whether or not schedule information is set that indicates the scheduled time when the ENERGY STORAGE SYSTEM 4 is controlled by means of scheduled operations. The charge-discharge details indicate whether charging is to be performed or discharging is to be performed.

For example, in order to prevent temporary interruption from occurring in the power supply of the electric power grid 14, it is desirable that the ENERGY STORAGE SYSTEM 4 is controlled by means of on-demand operations. On the other hand, in the case of performing control at relatively lenient time intervals such as during the nighttime, it is desirable that the ENERGY STORAGE SYSTEM 4 is controlled by means of scheduled operations in which the schedule of operation timings is set for performing charging and discharging control.

The feasibility information is used in identifying an electric power device such as the ENERGY STORAGE SYSTEM 4 that can (or is allowed to) simultaneously receive a plurality of different charging controls (or discharging controls). As illustrated in FIG. 7C, the feasibility information contains information that indicates such a ENERGY STORAGE SYSTEM 4 which is allowed to simultaneously receive a plurality of charging controls or discharging controls (which is allowed to perform sharing). For example, the feasibility information indicates whether or not it is allowed for an electric power device such as the ENERGY STORAGE SYSTEM 4 to simultaneously belong to a plurality of different charging groups. The feasibility information may also indicate whether or not it is allowed for an electric power device such as the ENERGY STORAGE SYSTEM 4 to simultaneously belong to a plurality of different discharging groups.

In FIG. 7C, it is illustrated that the ENERGY STORAGE SYSTEM 4 (ENERGY STORAGE SYSTEM A) can be subjected to charge-discharge control by a particular charge-discharge control device 7 in a particular period and can be subjected to charge-discharge control by a different charge-discharge control device 7 in another period. Meanwhile, when the charge-discharge control device 7 performs control of a plurality of ENERGY STORAGE SYSTEMs 4, there exists a plurality of sets of information of the storage batteries that are allowed to be controlled.

The dedicated device information is the information indicating whether an electric power device performs charging or performs discharging. As illustrated in FIG. 7D, the dedicated device information indicates that the photovoltaic power generating device 30 (a photovoltaic power generating device A) and a wind power generating device A are electric power devices that perform only discharging. Similarly, the dedicated device information indicates that a heat accumulator device A (such as the ENERGY STORAGE SYSTEM 24) is an electric power device that performs only charging.

According to the schedule information, the electric power control unit 75 performs grouping in such a way that each electric power device either belongs to a charging group for performing charging or a discharging group for performing discharging, and controls, on a group-by-group basis, each of the electric power devices, such as the ENERGY STORAGE SYSTEM 4, in each charging group as well as in each discharging group. Moreover, according to the determination result of the determining unit 720 and according to the schedule information, the group control unit 74 performs grouping in such a way that the electric power device that is not allowed to simultaneously belong to a plurality of charging groups is not simultaneously put in a plurality of charging groups and in such a way that electric power devices, such as the BATTERY UNIT 40, that perform charging belong to one or more charging groups; and controls the electric power devices put in each charging group on a group-by-group basis. Similarly, according to the determination result of the determining unit 720 and according to the schedule information, the group control unit 74 performs grouping in such a way that the electric power device, such as the ENERGY STORAGE SYSTEM 4, that is not allowed to simultaneously belongs to a plurality of discharging groups is not simultaneously put in a plurality of discharging groups and in such a way that electric power devices that perform discharging belong to one or more discharging groups; and controls the electric power devices in each discharging group on a group-by-group basis.

Moreover, as the validity time limit of charging groups or discharging groups, the group control unit 74 sets the interval of time in which the schedule time for performing charging or discharging as specified in the schedule information ends for the first time within a charging group or within a discharging group. Furthermore, the group control unit 74 again performs grouping with respect to the charging groups or the discharging groups to which belonged an electric power device that is disconnected for communication from the communicating unit 71, or again performs grouping with respect the charging groups or the discharging groups to which belonged an electric power device that has reached the validity time limit.

The electric power control unit 75 includes a calculating unit 750 that calculates the total amount of charging of the charging groups as well as calculates the total amount of discharging of the discharging groups by referring to electric power characteristics such as rated values included in the characteristic information. Moreover, according to the assigned amount of electric power for charging or the assigned amount of electric power for discharging that is set for an electric power device and according to the condition calculating information mentioned above, the calculating unit 750 calculate the total amount of charging of each charging group or the total amount of discharging of each discharging group.

Furthermore, with respect to a virtual BATTERY UNIT that has been obtained by grouping by the group control unit 74 (i.e., with respect to a single logical BATTERY UNIT that is a collection of a plurality of ENERGY STORAGE SYSTEMs 4), the electric power control unit 75 manages the total amount of charging and discharging as well as issues charge-discharge control instructions. FIG. 9 is a diagram for explaining the state of management performed by the electric power control unit 75 with respect to the total amount of charging and discharging. FIG. 10 is a graph illustrating the state of management performed by the electric power control unit 75 with respect to the total amount of charging and discharging.

As illustrated in FIG. 9, assume that a group A that is a virtual ENERGY STORAGE GROUP includes a BATTERY UNIT A (the ENERGY STORAGE SYSTEM 4) and a BATTERY UNIT B (the ENERGY STORAGE SYSTEM 4). During a time interval t1; if, for example, the BATTERY UNIT A discharges the electric power of 100 W and the BATTERY UNIT B discharges the electric power of 200 W, then the total amount of discharging becomes equal to 300 W. During a time interval t2, the BATTERY UNIT B performs charging of electric power. Meanwhile, alternatively, the BATTERY UNIT B (the ENERGY STORAGE SYSTEM 4) can exist as another virtual ENERGY STORAGE GROUP named group B and can perform charging of electric power within a time interval t3.

The storage batteries are not allowed to perform discharging and charging at the same time because of the reason that the operations become unclear. For example, with respect to a particular group, the charge-discharge control device 7 cannot perform control to let the BATTERY UNIT A discharge the electric power of 100 W and let the BATTERY UNIT B charge the electric power of 100 W at the same time. For that reason, the charge-discharge control device 7 performs grouping in such a way that each electric power device belongs to either a charging group for performing charging or a discharging group for performing discharging, and controls the electric power devices in each charging group and the electric power devices in each discharging group. Moreover, the charge-discharge control device 7 may perform control with respect to a plurality of different charging groups that perform charging and with respect to a plurality of different discharging groups that perform discharging.

With respect to the ENERGY STORAGE SYSTEM 4 that operates on the on-demand basis, the charge-discharge control device 7 specifies the amount of charging or the amount of discharging; while with respect to the ENERGY STORAGE SYSTEM 4 that operates according to a schedule, the charge-discharge control device 7 specifies the amount of charging or the amount of discharging as well as specifies a time interval. When sending a control instruction in the form of a communication message, the charge-discharge control device 7 can change the data model or the communication protocol according to the location. For example, the charge-discharge control device 7 can make use of IEC61850-7-420 that is a standard for electricity infrastructure related to the control of a dispersed power system such as the RENEWABLES 22; or can make use of BACnet that is a standard for buildings; or can make use of ECHONET that is used for Japanese households; or can make use of ZigBee (registered trademark) SEP 2 (SEP stands for Smart Energy Profile) that is used for European households.

Figure 11:
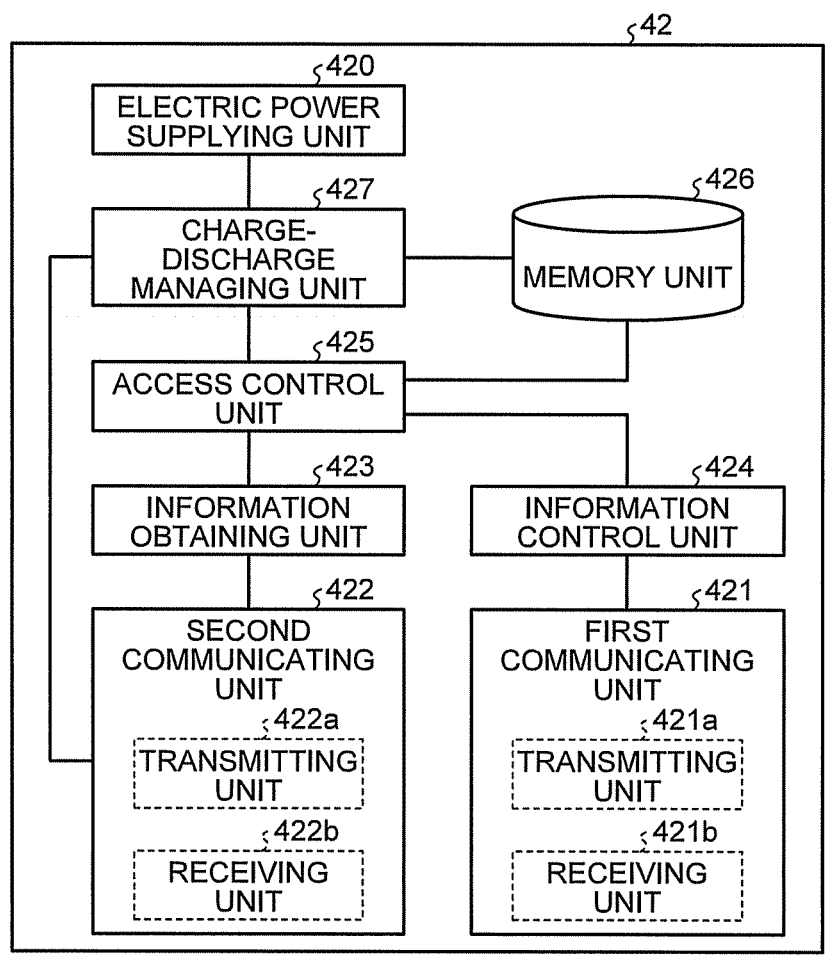
FIG. 11 is a functional block diagram illustrating the functions of a PCS (FIRST CONTROL UNIT) in the ENERGY STORAGE SYSTEM.

Explained below in detail are the functions of the ENERGY STORAGE SYSTEM 4. FIG. 11 is a functional block diagram illustrating the functions of the PCS (FIRST CONTROL UNIT) 42 in the ENERGY STORAGE SYSTEM 4. Meanwhile, practically, the battery charger 42a to which the EV system 32 is connected may have the same functions and the same configuration as the PCS (FIRST CONTROL UNIT) 42.

The PCS (FIRST CONTROL UNIT) 42 includes an electric power supplying unit 420, a first communicating unit 421, a second communicating unit 422, an information obtaining unit 423, an information control unit 424, an access control unit 425, a memory unit 426, and a charge-discharge managing unit 427. The electric power supplying unit 420 performs direct current-alternating current conversion, performs power frequency monitoring, and performs voltage fluctuation detection and control. Moreover, under the control of the charge-discharge control device 7, the electric power supplying unit 420 performs charge-discharge control with respect to the BATTERY UNIT 40.

The memory unit 426 is used store access control information, characteristics information, and operation control information. FIGS. 12A to 12C are diagrams illustrating configuration examples of the access control information, the characteristics information, and the operation control information stored in the memory unit 426.

The access control information is related to the feasibility information described above and is used in identifying whether or not it is possible to simultaneously receive charge-discharge control instructions from a plurality of charge-discharge control devices 7. As illustrated in FIG. 12A, the access control information contains information about a control authorization residual quantity and about devices having control authorization. For example, when simultaneous control from two charge-discharge control devices 7 is allowed, the ENERGY STORAGE SYSTEM 4 is simultaneously sharable and the control authorization residual quantity has the initial value of "2". Thus, when the control authorization residual quantity is "2", it means that the ENERGY STORAGE SYSTEM 4 is allowed to simultaneously belong to two charging groups or to simultaneously belong to two discharging groups.

Subsequently, when the access control unit 425 authorizes access control with respect to two charge-discharge control devices 7 (EMSa and EMSb), the control authorization residual quantity becomes "0" as illustrated in FIG. 12A. Consequently, no control is allowed from a third charge-discharge control device 7. Meanwhile, if simultaneous control from a plurality of charge-discharge control devices 7 is not allowed, that is, if the BATTERY UNIT 40 is not sharable; then the control authorization residual quantity has the initial value of "1". This is the same concept as the concept of semaphore for performing access control with respect to the common resources of a standard database server.

As illustrated in FIG. 12B, the characteristics information stored in the memory unit 426 is identical to the characteristics information stored in the memory unit 73. In the characteristics information, "type" indicates the types of electric power devices such as the ENERGY STORAGE SYSTEM 4, the RENEWABLES 22, the photovoltaic power generating device 30, and the ENERGY STORAGE SYSTEM 24 (heat accumulator device). Thus, "type" is used by the charge-discharge control device 7 in identifying the charging group or the discharging group to which an electric power device should belong. For example, the RENEWABLES 22 is identified as a dedicated device for performing only discharging, while a heat accumulator device is identified as a dedicated device for performing only charging.

The operation control information is used in identifying the operation condition (charge-discharge operation condition) of the ENERGY STORAGE SYSTEM 4.

The charge-discharge managing unit 427 processes charge-discharge determination information, which is related to the charge-discharge control of the ENERGY STORAGE SYSTEM 4, as well as processes charge-discharge electric power information; and outputs that information to the access control unit 425. FIGS. 13A and 13B is a diagram illustrating a configuration example of the charge-discharge determination information and a configuration example of the charge-discharge electric power information processed by the charge-discharge managing unit 427.

The charge-discharge determination information is used to indicate whether or not the BATTERY UNIT 40 is allowed to simultaneously belong to a plurality of charging groups or to simultaneously belong to a plurality of discharging groups, so that it becomes possible to identify whether or not charge-discharge control can be simultaneously performed by a plurality of charge-discharge control devices 7 by referring to physical constraint conditions of the BATTERY UNIT 40. For example, as illustrated in FIG. 13A, the charge-discharge determination information indicates that a charge request at the time of charging is allowed and a discharge request at the time of discharging is allowed. For example, when the control authorization residual quantity that is specified in the access control information illustrated in FIG. 12A has the initial value of "1", if a new charge request at the time of charging is not allowed, then the charge-discharge managing unit 427 determines that the BATTERY UNIT 40 is not allowed to simultaneously belong to a plurality of charging groups or to simultaneously belong to a plurality of discharging groups.

The charge-discharge electric power information is used in managing the allowed amount of electric energy (present values or planned values) assigned to a plurality of charge-discharge control device 7. For example, as illustrated in FIG. 13B, the charge-discharge electric power information contains rated discharge electric power indicated in unit watt (W: watt); rated charge electric power indicated in unit watt (W: watt); dischargeable time that is continually-updated while performing charging and discharging; chargeable time that is continually-updated while performing charging and discharging; and allowed electric energy.

Figure 14:
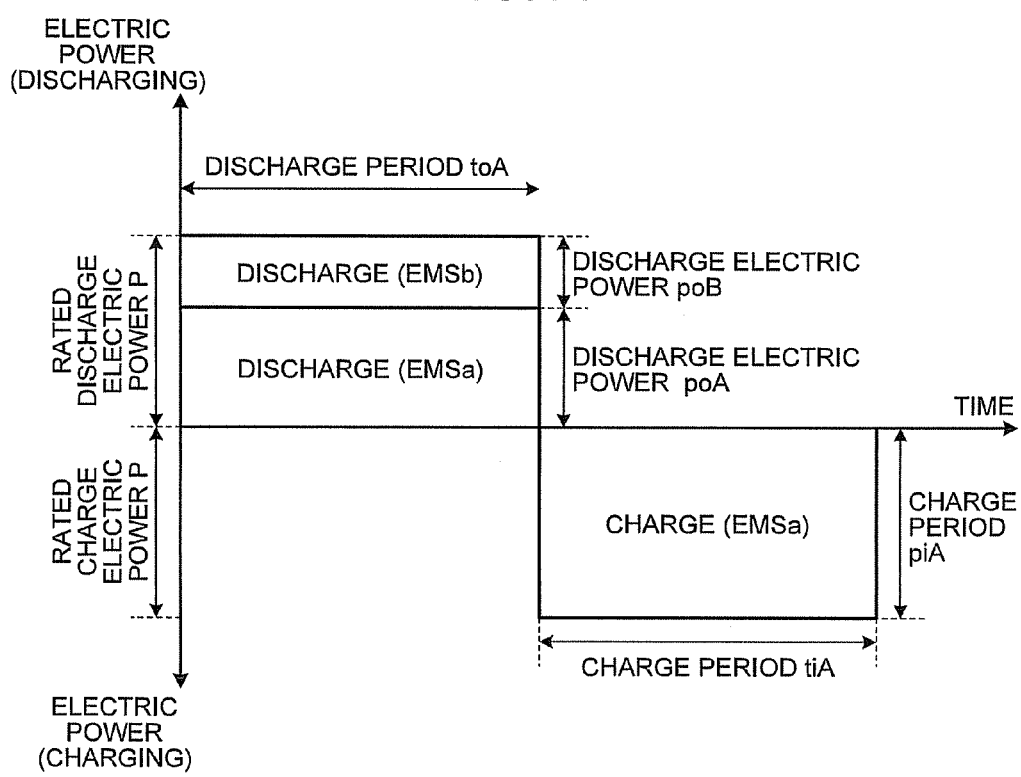
FIG. 14 is a graph illustrating a case when discharge control instructions are received from two charge-discharge control devices.

FIG. 14 is a graph illustrating a case when the ENERGY STORAGE SYSTEM 4 simultaneously receives discharge control instructions from two charge-discharge control devices 7 (EMSa and EMSb) according to the allowed electric energy specified in the charge-discharge electric power information.

The information control unit 424 generates a communication message, which is related to electric energy information or access control that is required for performing charging and discharging control and that is obtained by the PCS (FIRST CONTROL UNIT) 42 from the BATTERY UNIT 40; and sends that communication message to the charge-discharge control device 7 via the first communicating unit 421.

The information obtaining unit 423 periodically obtains, via the second communicating unit 422, the characteristics information described above as well as condition information (SOC, SOH, charge-discharge current, and charge-discharge voltage) that is the fluctuation information at the time of operation of the BATTERY UNIT 40.

The first communicating unit 421 includes a transmitting unit 421a and a receiving unit 421b, and performs communication with the charge-discharge control device 7 via the network 16.

The second communicating unit 422 includes a transmitting unit 422a and a receiving unit 422b, and performs communication with the BATTERY UNIT 40 via the CAN 18.

Figure 15:
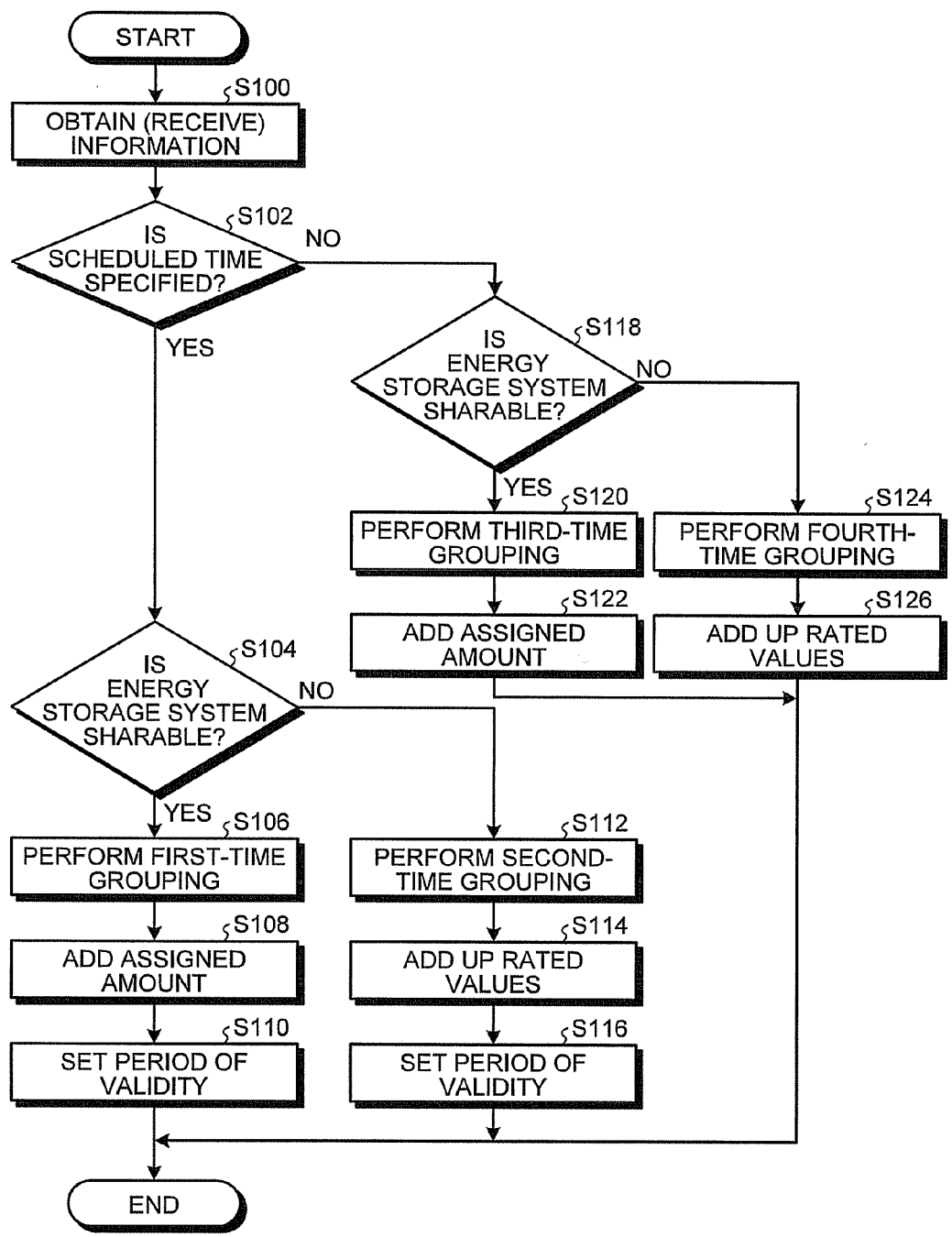
FIG. 15 is a flowchart for explaining a sequence of operations performed by the charge-discharge control device.

Explained below are the operations performed by the charge-discharge control device 7. FIG. 15 is a flowchart for explaining a sequence of operations performed by the charge-discharge control device 7. As illustrated in FIG. 15, firstly, the charge-discharge control device 7 obtains (receives) the schedule information that is set in each ENERGY STORAGE SYSTEM 4 as well as receives the characteristics information and the feasibility information of the BATTERY UNIT 40 either from each ENERGY STORAGE SYSTEM 4 or from another charge-discharge control device 7 (Step S100).

Then, the charge-discharge control device 7 determines whether or not the schedule information contains the scheduled time such as the start time of charging and the end time of charging or the start time of discharging and the end time of discharging (Step S102). If the charge-discharge control device 7 determines that the scheduled time is specified (Yes at Step S102), then the system control proceeds to Step S104. On the other hand, if the charge-discharge control device 7 determines that the scheduled time is not specified (No at Step S102), then the system control proceeds to Step S118.

Then, according to the feasibility information obtained at Step S100, the charge-discharge control device 7 determines whether or not the ENERGY STORAGE SYSTEM 4 is sharable (Step S104). If the charge-discharge control device 7 determines that the ENERGY STORAGE SYSTEM 4 is sharable (Yes at Step S104), then the system control proceeds to Step S106. On the other hand, if the charge-discharge control device 7 determines that the ENERGY STORAGE SYSTEM 4 is not sharable (No at Step S104), then the system control proceeds to Step S112.

Subsequently, the charge-discharge control device 7 performs first-time grouping (Step S106). During the first-time grouping, firstly, the charge-discharge control device 7 puts each ENERGY STORAGE SYSTEM 4 in a charging group or in a discharging group in accordance with the charging operation or the discharging operation specified in the schedule information. Then, the charge-discharge control device 7 puts each ENERGY STORAGE SYSTEM 4 in a charging group or in a discharging group in accordance with the scheduled time specified in the schedule information. Herein, the charge-discharge control device 7 performs grouping according to the feasibility information in such a way that each ENERGY STORAGE SYSTEM 4 simultaneously belongs to the number of charging groups or the number of discharging groups that is equal to or smaller than the control authorization residual quantity.

Subsequently, according to the assigned amount of electric power with respect to the charging groups or the discharging groups that is set in the ENERGY STORAGE SYSTEM 4 whose feasibility information has been received as well as according to the condition calculating information that enables derivation of the chargeable time and the rated value; the charge-discharge control device 7 adds the assigned amount (electric energy), which is set for the ENERGY STORAGE SYSTEM 4 whose feasibility information has been received, to the electric energy of each charging group or to the electric energy of each discharging group, and calculates the total amount of charging of each charging group or the total amount of discharging of each discharging group (Step S108).

Then, the charge-discharge control device 7 sets a period of validity in such a way that, for example, the time at which the schedule time for performing charging or discharging as specified in the schedule information ends for the first time within a charging group or within a discharging group serves as the validity time limit for charging groups or discharging groups (Step S110).

Subsequently, the charge-discharge control device 7 performs second-time grouping (Step S112). During the second-time grouping, firstly, the charge-discharge control device 7 puts each ENERGY STORAGE SYSTEM 4 in a charging group or in a discharging group in accordance with the charging operation or the discharging operation specified in the schedule information. Then, the charge-discharge control device 7 puts each ENERGY STORAGE SYSTEM 4 in a charging group or in a discharging group in accordance with the scheduled time specified in the schedule information. Herein, the charge-discharge control device 7 performs grouping in such a way that the ENERGY STORAGE SYSTEM 4 that is not allowed to simultaneously belong to a plurality of charging groups or a plurality of discharging groups is not simultaneously put in a plurality of charging groups or in a plurality of discharging groups and in such a way that the ENERGY STORAGE SYSTEM 4 belongs either to one or more charging groups or to one or more discharging groups.

Then, the charge-discharge control device 7 adds, according to the schedule information, the rated value of the charged electric energy or the rated value of the discharged electric energy of the ENERGY STORAGE SYSTEM 4 whose feasibility information has been received, to the electric energy of each charging group or to the electric energy of each discharging group, and calculates the total amount of charging of each charging group or calculates the total amount of discharging of each discharging group (Step S114).

Subsequently, the charge-discharge control device 7 sets a period of validity in such a way that, for example, the time at which the schedule time for performing charging or discharging as specified in the schedule information ends for the first time within a charging group or within a discharging group serves as the validity time limit for charging groups or discharging groups (Step S116).

Then, according to the feasibility information obtained at Step S100, the charge-discharge control device 7 determines whether or not the ENERGY STORAGE SYSTEM 4 is sharable (Step S118). If the charge-discharge control device 7 determines that the ENERGY STORAGE SYSTEM 4 is sharable (Yes at Step S118), then the system control proceeds to Step S120. On the other hand, if the charge-discharge control device 7 determines that the ENERGY STORAGE SYSTEM 4 is not sharable (No at Step S118), then the system control proceeds to Step S124.

Subsequently, the charge-discharge control device 7 performs third-time grouping (Step S120). During the third-time grouping, the charge-discharge control device 7 puts each ENERGY STORAGE SYSTEM 4 in an arbitrary charging group or in an arbitrary discharging group. Herein, the charge-discharge control device 7 performs grouping according to the feasibility information in such a way that each ENERGY STORAGE SYSTEM 4 simultaneously belongs to a number of charging groups or a number of discharging groups that is equal to or smaller than the control authorization residual quantity.

Then, according to the assigned amount of electric power with respect to the charging groups or the discharging groups that is set in the ENERGY STORAGE SYSTEM 4 whose feasibility information has been received as well as according to the condition calculating information that enables derivation of the chargeable time and the rated value; the charge-discharge control device 7 adds the assigned amount (electric energy), which is set for the ENERGY STORAGE SYSTEM 4 whose feasibility information has been received to the electric energy of each charging group or to the electric energy of each discharging group, and calculates the total amount of charging of each charging group or the total amount of charging of each discharging groups (Step S122).

Subsequently, the charge-discharge control device 7 performs fourth-time grouping (Step S124). During the fourth-time grouping, the charge-discharge control device 7 puts each ENERGY STORAGE SYSTEM 4 in a charging group or a discharging group. Herein, the charge-discharge control device 7 performs grouping in such a way that the ENERGY STORAGE SYSTEM 4 that is not allowed to simultaneously belong to a plurality of charging groups or a plurality of discharging groups is not simultaneously put in a plurality of charging groups or a plurality of discharging groups and in such a way that the ENERGY STORAGE SYSTEM 4 belongs either to one or more charging groups or to one or more discharging groups.

Then, the charge-discharge control device 7 adds, according to the schedule information, the rated value of the charged electric energy or the rated value of the discharged electric energy of the ENERGY STORAGE SYSTEM 4 whose feasibility information has been received, to the electric energy of each charging group or to the electric energy of each discharging group, and calculates the total amount of charging of each charging group or the total amount of discharging of each discharging group (Step S126).

Figure 16:
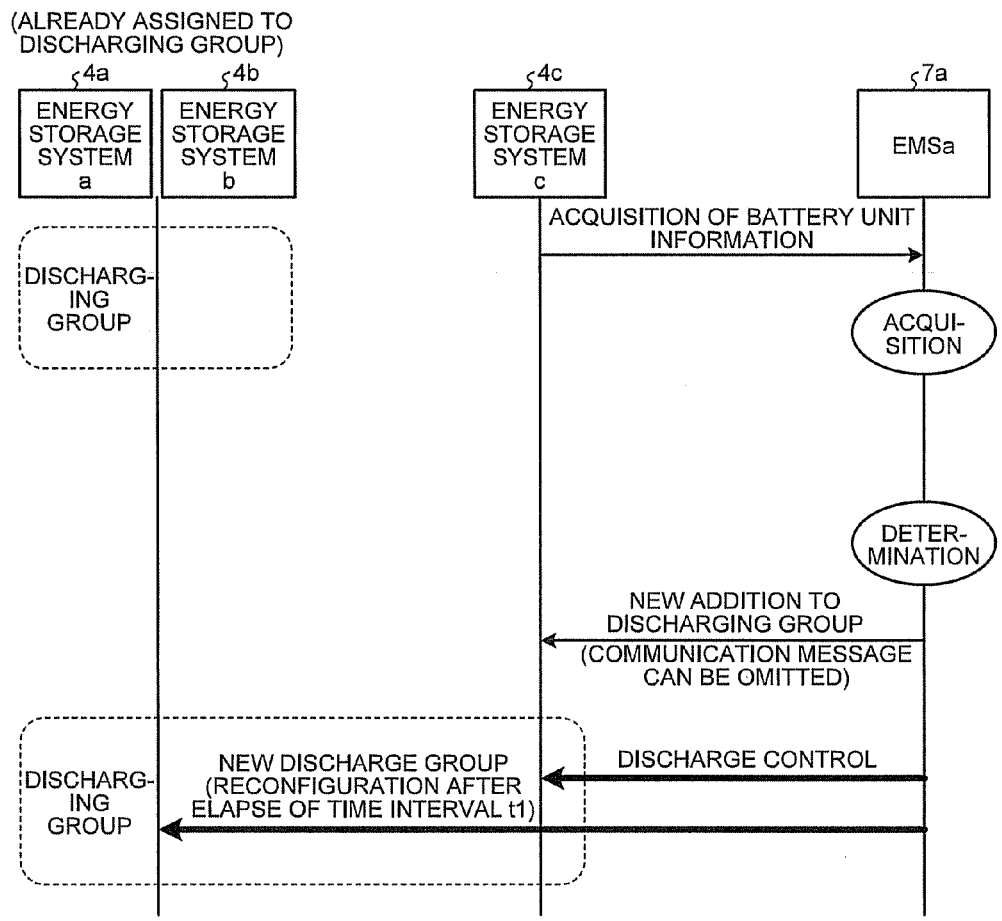
FIG. 16 is a sequence diagram illustrating operation examples of the charge-discharge control system.

Explained below are operation examples (first operation example to fourth operation examples) of the charge-discharge control system 1. FIG. 16 is a sequence diagram illustrating operation examples of the charge-discharge control system 1. In FIG. 16, it is assumed that the charge-discharge control system 1 includes, for example, a single charge-discharge control device 7a (EMSa) and three ENERGY STORAGE SYSTEMs 4a, 4b, and 4c (ENERGY STORAGE SYSTEMs a, b, and c).

First Operation Example

Each of the ENERGY STORAGE SYSTEMs 4a, 4b, and 4c performs charge-discharge control according to a schedule. Moreover, it is assumed that the ENERGY STORAGE SYSTEM 4a (ENERGY STORAGE SYSTEM a) and the ENERGY STORAGE SYSTEM 4b (ENERGY STORAGE SYSTEM b) are assigned to belong to the same discharging group.

Herein, in the case when a charge-discharge control device 7a performs grouping to put the ENERGY STORAGE SYSTEM 4c (ENERGY STORAGE SYSTEM c) in a charging group or in a discharging group; the charge-discharge control device 7a (EMSa) receives and obtains, from the ENERGY STORAGE SYSTEM 4c, BATTERY UNIT information that contains characteristics information, charge-discharge control information, and feasibility information. For example, the charge-discharge control device 7a receives communication messages illustrated in FIGS. 17A and 17B.

The communication message illustrated in FIG. 17A is sent by the ENERGY STORAGE SYSTEM 4 to the charge-discharge control device 7 and contains the schedule information. For example, the communication message illustrated in FIG. 17A contains a communication header of TCP/IP, an identifier used in identifying the message contents, the count of the charge-discharge control devices 7, the start time of performing charging or discharging, the end time of performing charging or discharging, and information indicating charge-discharge electric power.

The communication message illustrated in FIG. 17B is sent by the ENERGY STORAGE SYSTEM 4 to the charge-discharge control device 7 and contains the feasibility information and the characteristics information. For example, the communication message illustrated in FIG. 17B contains a communication header of TCP/IP, an identifier used in identifying the message contents, the access control information, the BATTERY UNIT characteristics information, and the charge-discharge control information.

The BATTERY UNIT information of the ENERGY STORAGE SYSTEM 4c has the schedule information (the charge-discharge control information) set therein, and it is assumed that the feasibility information allows sharing. As illustrated in FIG. 18, for example, during the time interval t1, with respect to a rated discharge electric power of W1 watt of the ENERGY STORAGE SYSTEM 4c, it is assumed that an assigned discharge electric power of w10 watt is already assigned to another charge-discharge control device 7.

Thus, during the time interval (discharge period) t1, the charge-discharge control device 7a determines that the electric power equal to (W1-w10) watt can be assigned for discharge control to be performed by itself. In the time interval (charge period) t2 after the elapse of the time interval t1, the ENERGY STORAGE SYSTEM 4c assigns an entire amount of a rated charge electric power of W2 watt for charge control. That is, in the time interval t2 after the elapse of the time interval t1, the charge-discharge control device 7a cannot assign the ENERGY STORAGE SYSTEM 4c for the purpose of charge-discharge control.

Figure 19:
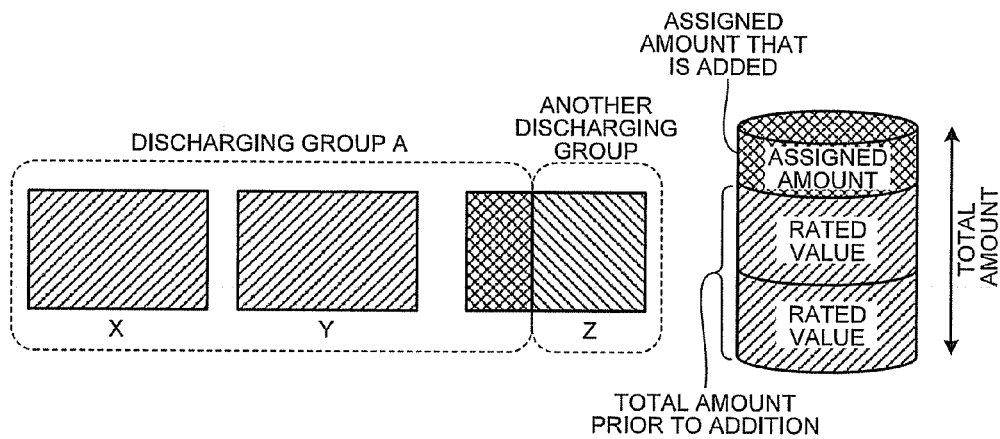
FIG. 19 is a schematic diagram that schematically illustrates the assignment of electric power in first-time grouping.

After determining the condition of the ENERGY STORAGE SYSTEM 4c by referring to the BATTERY UNIT information, the charge-discharge control device 7a determines the group in which the ENERGY STORAGE SYSTEM 4c is to be put. FIG. 19 is a schematic diagram that schematically illustrates the assignment of electric power in the first-time grouping. In FIG. 19, it is assumed that the charge-discharge control device 7a controls a plurality of groups including the discharging group A. More particularly, it is assumed that the charge-discharge control device 7a has already assigned the ENERGY STORAGE SYSTEM 4a having an identifier X and the ENERGY STORAGE SYSTEM 4b having an identifier Y to the discharging group A.

Herein, the ENERGY STORAGE SYSTEM 4c having an identifier Z has the schedule information (the charge-discharge control information) set therein, and it is assumed that the feasibility information allows sharing. Therefore, the ENERGY STORAGE SYSTEM 4c becomes the target of new addition to the discharging group A. Thus, the charge-discharge control device 7 performs grouping so as to put the ENERGY STORAGE SYSTEM 4c in the discharging group A, and adds the assigned discharge electric power of the ENERGY STORAGE SYSTEM 4c to the total electric power of the discharging group A.

More particularly, the charge-discharge control device 7a updates the information illustrated in FIG. 9 and FIG. 10 to the information related to the total amount of charging and discharging. Once the grouping is complete, the charge-discharge control device 7a can send a communication message regarding the updated discharging group to the ENERGY STORAGE SYSTEMs 4a, 4b, and 4c. For example, the charge-discharge control device 7a sends a communication message illustrated in FIG. 17C.

The communication message illustrated in FIG. 17C is sent by the charge-discharge control device 7 to the ENERGY STORAGE SYSTEM 4 and contains the charge-discharge control information. For example, the communication message illustrated in FIG. 17C contains a communication header of TCP/IP, an identifier used in identifying the message contents, the count of the charge-discharge control devices 7, the information indicating the charging groups and the discharging groups, and the BATTERY UNIT identifiers. Meanwhile, the charge-discharge control device 7a can set the BATTERY UNIT information in advance and obtain it. Moreover, the format of the communication messages is not limited to the format illustrated in FIGS. 17A to 17C, and any other format can be used.

The discharging group A has the period of validity equal to the time interval t1. The schedule information is set in such a way that, after the elapse in the time interval t1, the ENERGY STORAGE SYSTEM 4b performs not the discharge control but the charge control. That is, the end time of the discharge period t1 is the validity time limit of the discharging group A. Once the period of validity of the discharging group A is over, the charge-discharge control device 7a reconfigures the group to which belongs the ENERGY STORAGE SYSTEM 4 for which the period of validity is over. Meanwhile, as the communication message related to a discharge control instruction, the charge-discharge control device 7a can use a communication message that indicates the start of control. Moreover, in the scheduled-operation control in which the schedule time for performing charging or discharging is set in advance, the charge-discharge control device 7a may skip sending the communication message related to a discharge control instruction.

Second Operation Example

Each of the ENERGY STORAGE SYSTEMs 4a, 4b, and 4c performs charge-discharge control according to a schedule. Moreover, it is assumed that the ENERGY STORAGE SYSTEM 4a (ENERGY STORAGE SYSTEM a) and the ENERGY STORAGE SYSTEM 4b (ENERGY STORAGE SYSTEM b) are assigned to belong to the same discharging group.

The charge-discharge control device 7a selects the charging groups or the discharging groups to which the ENERGY STORAGE SYSTEM 4c (the ENERGY STORAGE SYSTEM c) should belong. Herein, from the ENERGY STORAGE SYSTEM 4c (the ENERGY STORAGE SYSTEM c), the charge-discharge control device 7a (EMSa) receives and obtains the BATTERY UNIT information that contains the charge-discharge control information and the feasibility information. For example, the charge-discharge control device 7a receives the communication messages illustrated in FIGS. 17A and 17B.

Figure 20:
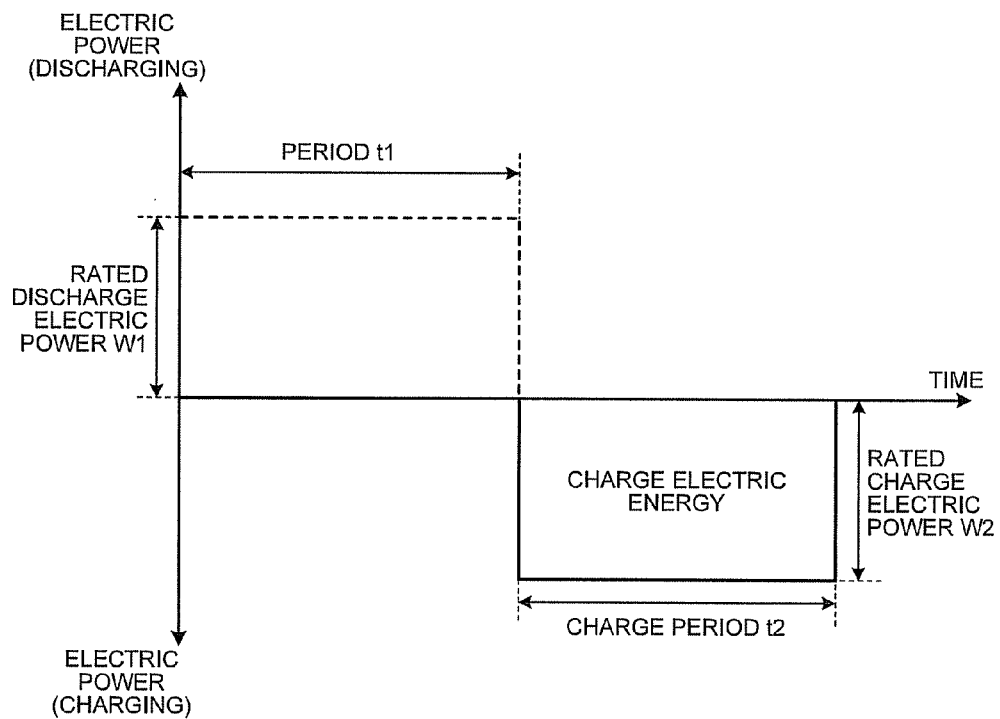
FIG. 20 is a graph illustrating a relationship between the rated charge electric power and the charge period.

The BATTERY UNIT information of the ENERGY STORAGE SYSTEM 4c has the schedule information (the charge-discharge control information), and the feasibility information does not allow sharing. Herein, as illustrated in FIG. 20, for example, during the time interval t1, the ENERGY STORAGE SYSTEM 4c determines that charging or discharging is not scheduled and that the total capacity of W1 watt of the rated discharge electric power can be assigned to the discharge control performed by the charge-discharge control device 7.

In the time interval (charge period) t2 after the elapse of the time interval t1, the ENERGY STORAGE SYSTEM 4c assigns the entire amount of the rated charge electric power of W2 watt for charge control. That is, in the time interval t2 after the elapse of the time interval t1, the charge-discharge control device 7a cannot assign the ENERGY STORAGE SYSTEM 4c for the purpose of charge-discharge control.

Figure 21:
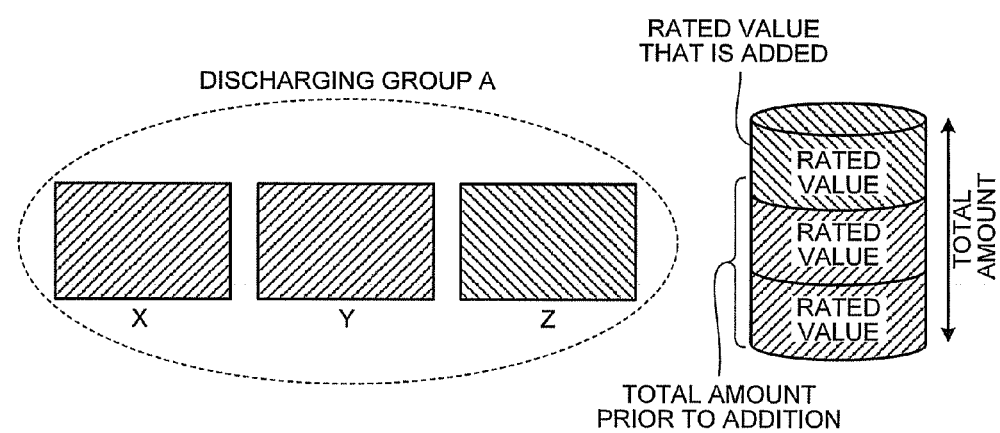
FIG. 21 is a schematic diagram that schematically illustrates the assignment of electric power in second-time grouping.

After determining the condition of the ENERGY STORAGE SYSTEM 4c by referring to the BATTERY UNIT information, the charge-discharge control device 7a determines the group in which the ENERGY STORAGE SYSTEM 4c is to be put. FIG. 21 is a schematic diagram that schematically illustrates the assignment of electric power in the second-time grouping. In FIG. 21, it is assumed that the charge-discharge control device 7a controls a plurality of groups including the discharging group A. More particularly, it is assumed that the charge-discharge control device 7a has already assigned the ENERGY STORAGE SYSTEM 4a having the identifier X and the ENERGY STORAGE SYSTEM 4b having the identifier Y to the discharging group A.

Herein, the ENERGY STORAGE SYSTEM 4c having the identifier Z has the schedule information (the charge-discharge control information) set therein, and it is assumed that the feasibility information does not allow sharing. Therefore, the ENERGY STORAGE SYSTEM 4c becomes the target of new addition to the discharging group A. Thus, the charge-discharge control device 7 performs grouping so as to put the ENERGY STORAGE SYSTEM 4c in the discharging group A, and adds the rated discharge electric power of the ENERGY STORAGE SYSTEM 4c to the total electric power of the discharging group A.

More particularly, the charge-discharge control device 7a updates the information illustrated in FIG. 9 and FIG. 10 to the information related to the total amount of charging and discharging. Once the grouping is complete, the charge-discharge control device 7a can send a communication message regarding the updated discharging group to the ENERGY STORAGE SYSTEMs 4a, 4b, and 4c. For example, the charge-discharge control device 7a sends a communication message illustrated in FIG. 17C.

The communication message illustrated in FIG. 17C is sent by the charge-discharge control device 7 to the ENERGY STORAGE SYSTEM 4 and contains the charge-discharge control information. For example, the communication message illustrated in FIG. 17C contains a communication header of TCP/IP, an identifier used in identifying the message contents, the count of the charge-discharge control devices 7, the information indicating the charging groups and the discharging groups, and the BATTERY UNIT identifiers. Meanwhile, the charge-discharge control device 7a can set the BATTERY UNIT information in advance and obtain it. Moreover, the format of the communication messages is not limited to the format illustrated in FIGS. 17A to 17C, and any other format can be used.

The discharging group A has the period of validity equal to the time interval t1. The schedule information is set in such a way that, after the elapse in the time interval t1, the ENERGY STORAGE SYSTEM 4b performs not the discharge control but the charge control. That is, the end time of the discharge period t1 is the validity time limit of the discharging group A. Once the period of validity of the discharging group A is over, the charge-discharge control device 7a reconfigures the group to which belongs the ENERGY STORAGE SYSTEM 4 for which the period of validity is over. Meanwhile, as the communication message related to a discharge control instruction, the charge-discharge control device 7a can use a communication message that indicates the start of control. Moreover, in scheduled-operation control in which the schedule time for performing charging or discharging is set in advance, the charge-discharge control device 7a may skip sending the communication message related to a discharge control instruction.

Third Operation Example

Each of the ENERGY STORAGE SYSTEMs 4a, 4b, and 4c performs charge-discharge control on the on-demand basis. Moreover, it is assumed that the ENERGY STORAGE SYSTEM 4a (ENERGY STORAGE SYSTEM a) and the ENERGY STORAGE SYSTEM 4b (ENERGY STORAGE SYSTEM b) are assigned to belong to the same discharging group.

The charge-discharge control device 7a selects the charging groups or the discharging groups to which the ENERGY STORAGE SYSTEM 4c (the ENERGY STORAGE SYSTEM c) should belong. Herein, from the ENERGY STORAGE SYSTEM 4c (the ENERGY STORAGE SYSTEM c), the charge-discharge control device 7a (EMSa) receives and obtains the BATTERY UNIT information that contains characteristics information, charge-discharge control information, and feasibility information. For example, the charge-discharge control device 7a receives the communication messages illustrated in FIGS. 17A and 17B.

The BATTERY UNIT information of the ENERGY STORAGE SYSTEM 4c does not have the schedule information (the charge-discharge control information) set therein, and it is assumed that the feasibility information allows sharing. As illustrated in FIG. 20, for example, the ENERGY STORAGE SYSTEM 4c determines that an arbitrary amount from the rated discharge electric power of W1 watt can be assigned to the discharge control performed by the charge-discharge control device 7.

Moreover, the ENERGY STORAGE SYSTEM 4c is not scheduled to assign the rated charge-discharge electric power for charge control. Thus, the charge-discharge control device 7a can assign the ENERGY STORAGE SYSTEM 4c for charge-discharge control.

After determining the condition of the ENERGY STORAGE SYSTEM 4c by referring to the BATTERY UNIT information, the charge-discharge control device 7a determines the group in which the ENERGY STORAGE SYSTEM 4c is to be put. As illustrated in FIG. 19, it is assumed that the charge-discharge control device 7a controls a plurality of groups including the discharging group A. More particularly, it is assumed that the charge-discharge control device 7a has already assigned the ENERGY STORAGE SYSTEM 4a having the identifier X and the ENERGY STORAGE SYSTEM 4b having the identifier Y to the discharging group A.

Herein, the ENERGY STORAGE SYSTEM 4c having the identifier Z does not have the schedule information (the charge-discharge control information) set therein, and it is assumed that the feasibility information allows sharing. Therefore, the ENERGY STORAGE SYSTEM 4c becomes the target of new addition to the discharging group A. Thus, the charge-discharge control device 7a performs grouping so as to put the ENERGY STORAGE SYSTEM 4c in the discharging group A, and adds the assigned discharge electric power of the ENERGY STORAGE SYSTEM 4c to the total electric power of the discharging group A.

More particularly, the charge-discharge control device 7a updates the information illustrated in FIG. 9 and FIG. 10 to the information related to the total amount of charging and discharging. Once the grouping is complete, the charge-discharge control device 7a can send a communication message regarding the updated discharging group to the ENERGY STORAGE SYSTEMs 4a, 4b, and 4c. For example, the charge-discharge control device 7a sends the communication message illustrated in FIG. 17C.

As the communication message related to a discharge control instruction, the charge-discharge control device 7a can use a communication message that indicates the start of control. Moreover, in scheduled-operation control in which the schedule time, for performing charging or discharging is set in advance, the charge-discharge control device 7a may skip sending the communication message related to a discharge control instruction.

Meanwhile, the charge-discharge control device 7a can also be configured in such a way that, during the period when the operations are being performed according to a schedule, the charge-discharge control device 7a performs operations identical to the third operation example even with respect to the interval of time in which a schedule period for performing charging or discharging is not set.

Fourth Operation Example

Each of the ENERGY STORAGE SYSTEMs 4a, 4b, and 4c performs charge-discharge control on the on-demand basis. Moreover, it is assumed that the ENERGY STORAGE SYSTEM 4a (ENERGY STORAGE SYSTEM a) and the ENERGY STORAGE SYSTEM 4b (ENERGY STORAGE SYSTEM b) are assigned to belong to the same discharging group.

The charge-discharge control device 7a selects the charging groups or the discharging groups to which the ENERGY STORAGE SYSTEM 4c (the ENERGY STORAGE SYSTEM c) should belong. Herein, from the ENERGY STORAGE SYSTEM 4c (the ENERGY STORAGE SYSTEM c), the charge-discharge control device 7a (EMSa) receives and obtains the BATTERY UNIT information that contains characteristics information, charge-discharge control information, and feasibility information. For example, the charge-discharge control device 7a receives the communication messages illustrated in FIGS. 17A and 17B.

The BATTERY UNIT information of the ENERGY STORAGE SYSTEM 4c does not have the schedule information (the charge-discharge control information) set therein, and it is assumed that the feasibility information does not allow sharing. Herein, for example, the ENERGY STORAGE SYSTEM 4c is not scheduled to performing charging or discharging and determines that the total amount of the rated discharge electric power of W1 watt can be assigned to the discharge control performed by the charge-discharge control device 7.

Moreover, the ENERGY STORAGE SYSTEM 4c is not scheduled to assign the rated charge-discharge electric power for charge control. Thus, the charge-discharge control device 7a can assign the ENERGY STORAGE SYSTEM 4c for charge-discharge control.

After determining the condition of the ENERGY STORAGE SYSTEM 4c by referring to the BATTERY UNIT information, the charge-discharge control device 7a determines the group in which the ENERGY STORAGE SYSTEM 4c is to be put. As illustrated in FIG. 21, it is assumed that the charge-discharge control device 7a controls a plurality of groups including the discharging group A. More particularly, it is assumed that the charge-discharge control device 7a has already assigned the ENERGY STORAGE SYSTEM 4a having the identifier X and the ENERGY STORAGE SYSTEM 4b having the identifier Y to the discharging group A.

Herein, the ENERGY STORAGE SYSTEM 4c having the identifier Z does not have the schedule information (the charge-discharge control information) set therein, and it is assumed that the feasibility information does not allow sharing. Therefore, the ENERGY STORAGE SYSTEM 4c becomes the target of new addition to the discharging group A. Thus, the charge-discharge control device 7a performs grouping so as to put the ENERGY STORAGE SYSTEM 4c in the discharging group A, and adds the rated discharge electric power of the ENERGY STORAGE SYSTEM 4c to the total electric power of the discharging group A.

More particularly, the charge-discharge control device 7a updates the information illustrated in FIG. 9 and FIG. 10 to the information related to the total amount of charging and discharging. Once the grouping is complete, the charge-discharge control device 7a can send a communication message regarding the updated discharging group to the ENERGY STORAGE SYSTEMs 4a, 4b, and 4c. For example, the charge-discharge control device 7a sends the communication message illustrated in FIG. 17C.

As the communication message related to a discharge control instruction, the charge-discharge control device 7a can use a communication message that indicates the start of control. Moreover, in scheduled-operation control in which the schedule time for performing charging or discharging is set in advance, the charge-discharge control device 7a may skip sending the communication message related to a discharge control instruction.

Meanwhile, the charge-discharge control device 7a can also be configured in such a way that, during the period when the operations are being performed according to a schedule, the charge-discharge control device 7a performs operations identical to the fourth operation example even with respect to the interval of time in which a schedule period for performing charging or discharging is not set.

The charge-discharge control device 7 according to the embodiment has, for example, a hardware configuration of a commonplace computer that includes a control device such as a central processing unit (CPU), a memory device such as a read only memory (ROM) or a random access memory (RAM), an external memory device such as a hard disk drive (HDD) or a compact disk (CD) drive device, a display device such as a display, and an input device such as a keyboard or a mouse.

A charge-discharge control program executed in the charge-discharge control device 7 according to the embodiment is recorded in the form of an installable or executable file on a computer-readable recording medium such as a compact disk read only memory (CD-ROM), a flexible disk (FD), a compact disk recordable (CD-R), or a digital versatile disk (DVD).

Alternatively, the charge-discharge control program executed in the charge-discharge control device 7 according to the embodiment can be saved in a downloadable manner on a computer connected to the Internet. Still alternatively, the charge-discharge control program executed in the charge-discharge control device 7 according to the embodiment can be distributed over a network such as the Internet.

Still alternatively, the charge-discharge control program executed in the charge-discharge control device 7 according to the embodiment can be stored in advance in, for example, a ROM. The charge-discharge control program executed in the charge-discharge control device 7 according to the embodiment contains modules for each of the abovementioned constituent elements (the receiving unit 712 and the group control unit 74). In practice, for example, a CPU (processor) reads the charge-discharge control program from the recording medium mentioned above and runs it so that the charge-discharge control program is loaded in main memory device. As a result, the module for each of the receiving unit 712 and the group control unit 74 is generated in the main memory device.

As described above, according to the embodiment, even if there is an increase in the number of electric power devices that are connected to a network, it becomes possible to perform communication in an efficient manner.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A charge-discharge control device comprising:
    a receiving unit configured to receive schedule information that indicates a schedule time at which a plurality of electric power devices, each having at least either a charging function or a discharging function and having first feasibility information set therein that indicates whether or not it is allowed to simultaneously receive a plurality of different charge controls, performs at least either charging or discharging, receive characteristic information that indicates electric power characteristics including a rated value of each of the plurality of electric power devices, and receive the first feasibility information;

a group controller configured to, according to the schedule information, perform grouping in such a way that each of the electric power devices belongs to either one of a charging group for performing charging and a discharging group for performing discharging and control, on a group-by-group basis, each of the electric power devices put in the charging group and each of the electric power devices put in the discharging group;

a calculator configured to, according to the characteristics information, calculate a total amount of charging of the charging group and calculates a total amount of discharging of the discharging group; and a determining unit configured to, according to the first feasibility information, determine whether or not the electric power device is allowed to simultaneously receive a plurality of charge controls, wherein according to a determination result of the determining unit and according to the schedule information, the group controller performs the grouping in such a way that the electric power device that is not allowed to simultaneously receive a plurality of charge controls do not simultaneously receive a plurality of charge controls and in such a way that the electric power devices belong to one or more charging groups, and controls the electric power devices put in the charging groups on the group-by-group basis.

2. The device according to claim 1, wherein, each of the electric power devices has second feasibility information set therein that indicates whether or not it is allowed to simultaneously receive a plurality of different discharge controls, the receiving unit further receives the second feasibility information, the determining unit determines, according to the second feasibility information, whether or not the electric power device is allowed to simultaneously receive a plurality of discharge controls, and according to a determination result of the determining unit and according to the schedule information, the group controller performs the grouping in such a way that the electric power device that is not allowed to simultaneously receive a plurality of discharge controls do not simultaneously receive a plurality of discharge controls and in such a way that the electric power devices belong to one or more discharging groups, and controls the electric power devices put in the discharging groups on the group-by-group basis.

3. The device according to claim 2, wherein, as a period of validity of the discharging groups, the group control unit sets an interval of time in which the schedule time for performing discharging as specified in the schedule information ends for the first time within the discharging groups.

4. The device according to claim 3, wherein, as a period of validity of the charging groups, the group control unit sets an interval of time in which the schedule time for performing charging as specified in the schedule information ends for the first time within the charging groups.

5. The device according to claim 2, wherein the receiving unit receives condition calculating information that enables derivation of a dischargeable time and a rated value of each of the plurality of electric power devices, and when the determining unit determines that the electric power devices that have received the feasibility information are allowed to simultaneously receive a plurality of different discharge controls, the calculator calculates a total amount of discharging of each discharging group according to an amount of assigned electric power set for the electric power device whose second feasibility information has been received and according to the condition calculating information.

6. The device according to claim 5, wherein, when the determining unit determines that the electric power device whose second feasibility information has been received is not allowed to simultaneously receive a plurality of different discharge controls, the calculator calculates a total amount of discharging of each discharging group according to the rated value of the electric power device whose second feasibility information has been received.

7. The device according to claim 2, wherein, at least one of the electric power devices is a heat accumulator device, when the second feasibility information of the heat accumulator device is received, the group controller performs grouping in such a way that the heat accumulator device belongs to the charging group, and the calculator calculates a total amount of charging of the charging group according to a rated value of the heat accumulator device.

8. The device according to claim 1, wherein, as a period of validity of the charging groups, the group control unit sets an interval of time in which the schedule time for performing charging as specified in the schedule information ends for the first time within the charging groups.

9. The device according to claim 8, wherein the group controller again performs grouping with respect to the charging groups to which belonged the electric power devices that are disconnected for communication from the receiving unit and with respect to the charging groups that have reached the period of validity.

10. The device according to claim 1, wherein the receiving unit receives condition calculating information that enables derivation of a chargeable time and a rated value of each of the plurality of electric power devices, and when the determining unit determines that the electric power devices that have received the feasibility information are allowed to simultaneously receive a plurality of different charge controls, the calculator calculates a total amount of charging of each charging group according to an amount of assigned electric power set for the electric power device whose first feasibility information has been received and according to the condition calculating information.

11. The device according to claim 10, wherein, when the determining unit determines that the electric power device whose first feasibility information has been received is not allowed to simultaneously receive a plurality of different charge controls, the calculator calculates a total amount of charging of each charging group according to the rated value of the electric power device whose first feasibility information has been received.

12. The device according to claim 1, wherein, at least one of the electric power devices is a photovoltaic power generating device, and when the first feasibility information of the photovoltaic power generating device is received, the group controller performs grouping in such a way that the photovoltaic power generating device belongs to the discharging group, and the calculator calculates a total amount of discharging of the discharging group according to a rated value of the photovoltaic power generating device.

13. The device according to claim 1, wherein at least one of the plurality of electric power devices includes a BATTERY UNIT.

14. The device according to claim 1, wherein the receiving unit receives the schedule information either from "one of the electric power devices" or from another charge-discharge control device.

15. A charge-discharge control system comprising:
a plurality of electric power devices each having at least either a charging function or a discharging function and having feasibility information set therein that indicates whether or not it is allowed to simultaneously receive a plurality of different charge controls; and
a charge-discharge control device that controls the plurality of electric power devices, wherein
the charge-discharge control device includes
a receiving unit configured to receive schedule information that indicates a schedule time at which the plurality of electric power devices perform at least either charging or discharging,
receive characteristics information that indicates electric power characteristics including a rated value of each of the plurality of electric power devices, and
receive the feasibility information;
a group controller configured to, according to the schedule information, perform grouping in such a way that each of the electric power devices belongs to either one of a charging group for performing charging and a discharging group for performing discharging, and control, on a group-by-group basis, each of the electric power devices put in the charging group and each of the electric power devices put in the discharging group;
a calculator configured to, according to the characteristics information, calculate a total amount of charging off the charging group and calculates a total amount of discharging of the discharging group; and
a determining unit configured to, according to the feasibility information, determine whether or not the electric power device is allowed to simultaneously receive a plurality of charge controls, wherein
according to a determination result of the determining unit and according to the schedule information, the group controller performs the grouping in such a way that the electric power device that is not allowed to simultaneously receive a plurality of charge controls do not simultaneously receive a plurality of charge controls and in such a way that the electric power devices belonging to one or more charging groups, and controls the electric power devices put in the charging groups on the group-by-group basis.

16. A computer program product comprising a computer-readable recording medium containing a charge-discharge control program that causes a computer to execute:
receiving schedule information that indicates a schedule time at which a plurality of electric power devices, each having at least either a charging function or a discharging function and having feasibility information set therein that indicates whether or not it is allowed to simultaneously receive a plurality of different charge controls, performs at least either charging or discharging;
receiving characteristics information that indicates electric power characteristics including a rated value of each of the plurality of electric power devices;
receiving the feasibility information;
performing grouping, according to the schedule information, in such a way that each of the electric power devices belongs to either one of a charging group for performing charging and a discharging group for performing discharging;
controlling, on a group-by-group basis, each of the electric power devices put in the charging group and each of the electric power devices put in the discharging group;
calculating, according to the characteristics information, a total amount of charging of the charging group and calculates a total amount of discharging of the discharging group; and
determining, according to the feasibility information, whether or not the electric power device is allowed to simultaneously receive a plurality of charge controls, wherein
the performing grouping includes performing, according to a determination result of the determining and according to the schedule information, the grouping in such a way that the electric power device that is not allowed to simultaneously receive a plurality of charge controls do not simultaneously receive a plurality of charge controls and in such a way that the electric power devices belong to one or more charging groups, and
the controlling includes controlling the electric power devices put in the charging groups on the group-by-group basis.

* * * * *